(12) United States Patent
Li et al.

(10) Patent No.: US 11,381,805 B2
(45) Date of Patent: Jul. 5, 2022

(54) AUDIO AND VIDEO STREAM RENDERING MODIFICATION BASED ON DEVICE ROTATION METRIC

(71) Applicant: Loop Now Technologies, Inc., Redwood City, CA (US)

(72) Inventors: Wu-Hsi Li, Somerville, MA (US); Jerry Ting Kwan Luk, Menlo Park, CA (US)

(73) Assignee: Loop Now Technologies, Inc., San Mateo, CA (US)

( * ) Notice: Subject to any disclaimer, the term of this patent is extended or adjusted under 35 U.S.C. 154(b) by 0 days.

(21) Appl. No.: 17/086,333

(22) Filed: Oct. 31, 2020

(65) Prior Publication Data

US 2021/0051316 A1    Feb. 18, 2021

Related U.S. Application Data

(63) Continuation-in-part of application No. 16/865,985, filed on May 4, 2020, which is a continuation-in-part of application No. 16/423,332, filed on May 28, 2019, now Pat. No. 10,645,331.

(Continued)

(51) Int. Cl.
| | |
|---|---|
| *H04N 13/359* | (2018.01) |
| *H04N 13/351* | (2018.01) |
| *H04N 13/296* | (2018.01) |
| *H04N 21/44* | (2011.01) |
| *H04N 5/262* | (2006.01) |
| *H04N 5/60* | (2006.01) |

(Continued)

(52) U.S. Cl.
CPC ......... *H04N 13/359* (2018.05); *H04N 5/2628* (2013.01); *H04N 5/607* (2013.01); *H04N 13/194* (2018.05); *H04N 13/296* (2018.05); *H04N 13/351* (2018.05); *H04N 21/41407* (2013.01); *H04N 21/44* (2013.01); *H04N 21/47217* (2013.01)

(58) Field of Classification Search
USPC ........................................................ 348/68
See application file for complete search history.

(56) References Cited

U.S. PATENT DOCUMENTS

| | | |
|---|---|---|
| 8,069,414 B2 | 11/2011 | Hartwig et al. |
| 8,244,707 B2 | 8/2012 | Lin et al. |

(Continued)

FOREIGN PATENT DOCUMENTS

KR        101606860 B1    3/2016

*Primary Examiner* — Mikhail Itskovich
(74) *Attorney, Agent, or Firm* — Adams Intellex, PLC

(57) ABSTRACT

Disclosed techniques include audio and visual stream rendering modification based on device rotation metric. One or more media streams are received from a server. The one or more media streams are targeted for display on a handheld media stream playback device. An orientation of the handheld device is determined during playback of at least one of the one or more media streams on the handheld device. A change in orientation of the handheld device is detected. The change occurs during playback of the at least one of the one or more media streams. Based on detecting the change in orientation, a rotation angle of the handheld device is calculated. Based on the rotation angle, the playback of at least one of the one or more media streams is changed on the handheld device.

32 Claims, 31 Drawing Sheets

Related U.S. Application Data

(60) Provisional application No. 62/929,584, filed on Nov. 1, 2019, provisional application No. 62/801,987, filed on Feb. 6, 2019.

(51) Int. Cl.
*H04N 21/414* (2011.01)
*H04N 21/472* (2011.01)
*H04N 13/194* (2018.01)

(56) References Cited

U.S. PATENT DOCUMENTS

| | | |
|---|---|---|
| 8,572,490 B2 | 10/2013 | Hartwig et al. |
| 9,118,712 B2 | 8/2015 | McCoy et al. |
| 9,532,116 B2 | 12/2016 | Terpe |
| 9,824,372 B1 | 11/2017 | Seth et al. |
| 10,089,402 B1 | 10/2018 | Winkler et al. |
| 2010/0149359 A1 | 6/2010 | Taoka |
| 2013/0021373 A1 | 1/2013 | Vaught et al. |
| 2013/0276021 A1 | 10/2013 | Cho |
| 2014/0043231 A1* | 2/2014 | Yoshioka ............... G09G 5/00 345/156 |
| 2015/0195175 A1 | 7/2015 | Kariman |
| 2015/0309686 A1* | 10/2015 | Morin .................... G06F 3/017 715/720 |
| 2016/0065929 A1 | 3/2016 | Barcons-Palau et al. |
| 2016/0088369 A1 | 3/2016 | Terpe |
| 2016/0093105 A1 | 3/2016 | Rimon et al. |
| 2018/0253765 A1 | 9/2018 | Avedissian et al. |
| 2018/0288396 A1 | 10/2018 | Bouazizi et al. |
| 2018/0316948 A1* | 11/2018 | Todd ................. H04N 21/4753 |

* cited by examiner

AUDIO AND VIDEO STREAM RENDERING MODIFICATION BASED ON DEVICE ROTATION METRIC

RELATED APPLICATIONS

This application claims the benefit of U.S. provisional patent application "Immersive Audio-Visual Experience" Ser. No. 62/929,584, filed Nov. 1, 2019.

This application is also a continuation-in-part of U.S. patent application "Immersive Video Experience Including Rotation" Ser. No. 16/865,985, filed May 4, 2020, which claims the benefit of U.S. provisional patent application "Immersive Audio-Visual Experience" Ser. No. 62/929,584, filed Nov. 1, 2019.

The U.S. patent application "Immersive Video Experience Including Rotation" Ser. No. 16/865,985, filed May 4, 2020 is also a continuation-in-part of U.S. patent application "Immersive Video Experience" Ser. No. 16/423,332, filed May 28, 2019, which claims the benefit of U.S. provisional patent application "Immersive Video Experience" Ser. No. 62/801,987, filed Feb. 6, 2019.

Each of the foregoing applications is hereby incorporated by reference in its entirety.

FIELD OF ART

This application relates generally to media stream playback and more particularly to audio and video stream rendering modification based on a device rotation metric.

BACKGROUND

Viewing online videos is a popular, worldwide internet activity. Some watch on smartphones, tablets, or computers, while others watch on a smart TV or a connected device or other device. As online technology has improved, so has viewer engagement. Online video content appeals to viewers not only because it can convey information, but also because it can stir emotions, which video technology has taken to a new level. Video technology enhances or imitates the physical world using digital simulations. It can give users the sense of being absorbed into a setting in which they can look and see content. In some cases, the technology extends reality. In other cases, it creates a new reality. Types of video technology include 360, virtual reality, augmented reality, mixed reality, and more. Audiovisual, interactive formats can make the audience feel like they are active participants, controlling participants' senses while a story unfolds.

Video technology can be used in many applications. Travel industries have used video technology to showcase domestic and foreign destinations. Some travel companies have used the technology to distract those who are afraid of plane rides and boat rides. Hotels and resorts can use it as a sales tool by highlighting their amenities, tapping the emotions of potential tourists in new ways. In a similar manner, real estate, engineering, and construction industries have used video technology to create dream settings like homes, offices, and workspaces to entice customers. Video technology has many marketing applications including booths at trade shows, fairs, malls, and sporting events. Online ads that expose customers to messaging and branding also use the technology. E-commerce has used video technology to enable customers to take virtual test drives in new cars, to see how products would look in their homes, or to assess how clothing would look when worn by the actual customer. In a sense, video technology offers a virtual try-before-you-buy experience. Video technology has also been used in healthcare to distract patients from pain and to enable doctors to experience what patients experience, which promotes empathy. Educational games are an application of video technology to a generation that already enjoys it for entertainment and can now use it to learn as well. The gaming industry has been at the forefront of using the technology, often pushing the bounds of its trajectory. And art applications, like interactive pieces in museums or company branding images, have also benefitted because, in a sense, video technology is a new canvas on which to create.

Despite all the applications for video technology and the benefits of it, there are still limitations. Though the technology is improving, there can be technical glitches. Compatibility issues can be frustrating for users. Low-quality audiovisual material can interfere with user enjoyment and can lead to a negative experience and lost sales or a bad reputation. The equipment needed to improve quality can be expensive. Some user equipment is heavy and awkward. In certain circumstances, video technology equipment completely cuts off a user from the real world. And in some cases, users have reported motion sickness as a result of using the technology. Video technology companies must address these limitations to improve user experience and to make the technology available to all.

SUMMARY

When people view video content, they use a wide range of electronic devices, such as desktop computers, laptop computers, tablets, smartphones, and personal digital assistants (PDAs). The video content can include text, livefeed videos, news, art, entertainment, educational material, and so on. Digital technology allows people to interact with the video content using augmented reality, virtual reality, mixed reality, and more. When interacting with video content, a person will move, tilt, or rotate the display screen, which alters the video content and creates an immersive experience. Studies have shown that positive, engaging user experiences can create increased referrals and customer loyalty. However, a negative user experience can lead to lost revenue and a bad reputation. The immersive experience can be negatively impacted by device or software limitations, poor image quality and transitions, fixed video orientation, and video boundary conditions that result in viewing black space instead of video content.

The media stream playback technology disclosed herein allows a user to shift smoothly between a single view playback and multiple view playback on a handheld media stream playback device by rotating the handheld device. The single view playback includes one video stream and one or more audio streams, and it can be predominantly vertical. The multiple view playback includes multiple video streams and associated audio streams, and it can be predominantly horizontal. The seamless shift in playback viewing can enhance applications like rotating a phone to see a vocalist go from singing alone to three-part harmony. It could also include applications like rotating the phone to turn captions on and off or changing the language. The media stream playback technology disclosed herein allows a user to deliver a combination of one or more audiovisual streams based on one or more parameters identifying orientation of the display screen of the device displaying the one or more audiovisual streams.

A processor-implemented method for media stream playback is disclosed comprising: receiving one or more media streams from a server, wherein the one or more media streams are targeted for display on a handheld media stream playback device; determining an orientation of the handheld device during playback of at least one of the one or more media streams on the handheld device; detecting a change in the orientation of the handheld device, wherein the change occurs during playback of the at least one of the one or more media streams; calculating a rotation angle of the handheld device, based on the detecting; and changing the playback of at least one of the one or more media streams on the handheld device, based on the rotation angle. The playback of a combination of two or more media streams is changed based on the rotation angle. Based on the rotation angle, the combination is changed from a single view playback in an original orientation to a multiple view playback in a changed orientation. The rotation angle is used to generate a rotation metric, wherein the rotation metric impacts zoom calculations and renderings for the multiple view playback. Based on the rotation angle, the combination is changed from a multiple view playback in an original orientation to a single view playback in a changed orientation.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
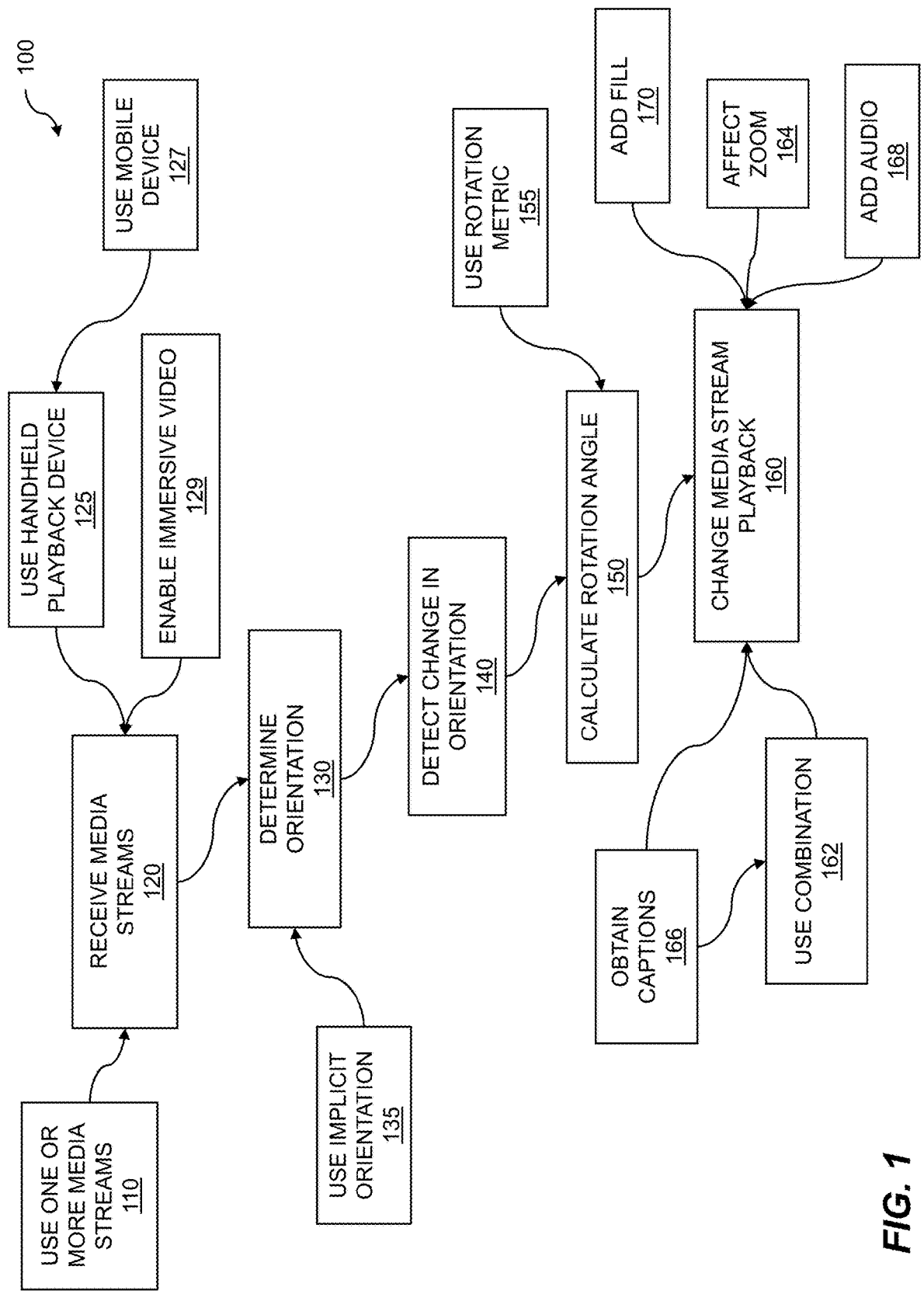
FIG. 1 is a flow diagram for audio and video stream rendering modification based on a device rotation metric.

Handheld electronic devices such as tablets, smartphones, PDAs, and media players are widely used by people who want to view and interact with media content. The content, which is often delivered as video and audio streams, can include educational, informational, political, social, and other media content. The content can be easily accessed using apps on handheld devices or on specialty media players, web browsers, and so on. The media content includes a wide range of subjects, ranging from news, government information, and educational material, to entertainment content, and beyond. The content most frequently sought by users includes video content. The video content can include videos, video clips, short-form videos, graphic interchange format files (GIFs), animations, mashups, and other content. This other content can further include audio and text which are used to enhance the video viewing experience. An individual viewing the media content can react to the content and may wish to respond to it. The responding can include commenting on or reacting to the content. Responses can be posted on a site that provides the media content, can be shared on a social media site, and so on.

One of the limitations of most media content is that the content is static. The content is designed to be viewed and experienced in a manner defined by the media creator. While a user can choose to change settings associated with the content, such as selecting an audio language, viewing or hiding subtitles, or setting an aspect ratio or video resolution for viewing, the settings are adjusted based on menu selections. The menu settings are "set and forget" type settings, where once configured, the settings remain until the user returns to the menus to make adjustments. In techniques disclosed herein, playback of at least one of the media streams rendered on the handheld device can be changed by rotating the device. The rotation, which can include a clockwise rotation, a counterclockwise rotation, a tilting, and so on, can effect changes in the ways audio and video streams are presented on the handheld device. By rotating the handheld device, the user changes the manner in which media streams are displayed. The rotating the handheld device can be used to combine two or more media streams for display on the handheld device, or to view a single media stream. The rotating can be used to access other information associated with the media streams such as exposing or hiding captions, providing song lyrics, or adding voices of people or sounds of instruments that come into view as the device is rotated. The user has significantly more control over the manner in which the media streams are presented. Further, the changes made to the playback by the rotating enable an immersive video and audio experience. The immersive experience enables virtual reality and augmented reality viewing of the media streams.

Techniques for audio and video stream rendering modification based on a device rotation metric are disclosed. An individual can use a handheld device such as a mobile device to experience media streams that include video streams, audio streams, and captions. The media streams can include video streams and associated audio streams. The media streams can be consumed for personal use or amusement, for social sharing, for education or training, for making political statements, for presenting calls to action, and so on. The media streams can be generated by individuals; purchased by consumers; or created by influencers, tastemakers, politicians, and others. The media streams can include travel videos, cooking videos, home improvement videos, makeup videos, animal videos, music videos, etc. As the individual rotates the handheld device used to experience the media streams, the playback and rendering of the media streams can be changed. The changing can include combining two or more media streams for presentation or presenting a single media stream, based on the orientation of the handheld device. The rotating of the device can further affect zooming in a video stream or zooming out of the video stream. The rotating can be used to present or hide further information such as captions associated with the media steams. The rotating can also be used to add audio streams, which creates a multi-dimensional audio space that can be experienced by the user. The modifying the rendering of the audio streams and the video streams on the handheld device creates an immersive experience, such as a virtual reality or an augmented reality experience, for the user.

Media stream playback is enabled using audio and video stream rendering modification based on a device rotation metric. One or more media streams are provided, where the media streams can include audio streams, video streams, captions, and so on. The audio streams can include voice, music, sound effects, and the like. The video streams can include long-form videos, short-form videos, video clips, and so on. The media streams can be sourced from a server, from the Internet, from a streaming service, and so on. The media streams are targeted for display on a handheld media stream playback device. The handheld media stream playback device can include a mobile device such as a smartphone or tablet. The media streams can be based on resolutions, formats, codecs, etc. that are appropriate for rendering on the handheld device. An orientation of the handheld device is determined during playback of at least one of the one or more media streams on the handheld device. The orientation of the handheld device can include vertical, horizontal, an angle between vertical and horizontal, tilted, rotated, and the like. A change in the orientation of the handheld device is detected, wherein the change occurs during playback of the at least one of the one or more media streams. As the media streams are being played back, a user can rotate the handheld device. The rotating the handheld device can be used to control the playback. A rotation angle of the handheld device is calculated, based on the detecting. The rotation angle can be calculated based on a coordinate system. The playback of at least one of the one or more media streams is changed on the handheld device, based on the rotation angle. The changing the playback can include combining videos, zooming, receiving captions, adding audio, filling video, and so on.

It should be noted that the terminology regarding the orientation of a handheld device is largely dependent on the how the user of the device perceives his or her usage of that device. For example, many users holding a rectangular smart phone in front of them would describe it as being in a "vertical" orientation when the longer axis of the rectangular shape of the smart phone is up and down, and they would likewise describe it as being in a "horizontal" orientation when the longer axis of the rectangular shape is side-to-side. This perception aligns with the common nomenclature of a portrait orientation (vertical) and a landscape orientation (horizontal). However, depending on the device and the user, that designation may be reversed or even somewhat arbitrary. One obviously unclear case for the nomenclature is for the orientation of a round or square device (or round or square viewport). Another unclear case is for a device normally used in a different orientation, for example a laptop or perhaps even a "phablet". Thus referring to a "starting orientation" or an "original orientation" or an "initial orientation" and then looking for a subsequent change in orientation can be a helpful way to interpret handheld device orientation.

The media stream playback technology disclosed herein provides an immersive video viewing experience for videos recorded by generic mobile devices and delivers a smooth video rendering even when the viewer is rotating, moving, and tilting the viewing device as part of the interaction. Specifically, a good/smooth viewing experience may include that:

(a) The video stays in bounds: the user cannot see outside the video, which results in an undesirable partial black screen;
(b) The user can zoom in only when necessary: to enable the user to view as much part of the video as possible;
(c) The video displays a stable view: to avoid dramatic movement or scaling on rotating or tilting;
(d) The video displays a smart view: when only a partial view of the video is visible, the significant part is shown, if possible; and
(e) Video quality is ensured in every angle.

To provide the immersive experience, a geometric-based system is designed in order to achieve one or more of the above results. An implementation of the video playback technology disclosed herein obtains various parameters of the video including the following:

(1) Size of video (width and height, defined in pixels);
(2) Size of viewport (width and height, defined in pixels);
(3) $\theta$, the rotating angle of viewport; and
(4) a, the scale factor.

FIG. 1 is a flow diagram for audio and video stream rendering modification based on a device rotation metric. One or more media streams are received from a server. The media streams can be selected, combined, augmented, modified, and so on, based on an orientation of a handheld device. The one or more media streams are targeted for display on a handheld media stream playback device. The handheld media stream playback device can include a mobile device such as a smartphone or tablet. The media streams include video streams and audio steams. The video streams can include various media types such as news videos, entertainment videos, political message videos, cooking videos, animal videos, and so on. The audio streams can include single, monaural streams; paired binaural or stereo streams; second audio program (SAP) streams; and so on. An orientation of the handheld device is determined, where the orientation can include upright or lying down, tilted, rotated, and the like. A change in device orientation is detected, and a rotation angle is calculated. The playback on the handheld device of at least one of the one or more media streams is changed, based on the rotation angle.

The flow 100 includes using one or more media streams 110. The media streams can include video streams, audio streams, text streams, and the like. The media streams can be used to display presentations to a user of a handheld device discussed below. The media streams can be used to convey a message, to provide entertainment, to educate, etc. The flow 100 includes receiving one or more media streams 120 from a server. Discussed throughout, the media streams can include video streams, audio streams, text streams, and the like. In embodiments, the media streams comprise only audio streams. In embodiments, each audio stream comprises a left and right channel, usually representing a stereo audio stream. Thus three audio streams can include six audio channels. The media streams can include long-form videos, short-form videos, GIFs, animations, etc. The media stream can further include one or more audio streams where the one or more audio streams can include audio associated with the one or more video streams. In the flow 100, the one or more media streams are targeted for display on a handheld media stream playback device 125. The handheld media stream playback device can include a personal electronic device owned by or used by an individual. The flow 100 includes using a mobile device 127. The mobile device can include a wirelessly enabled handheld device such as a smartphone, a tablet, a personal digital assistant (PDA), and the like. The mobile device can include a purpose-built mobile device such as a media player device. A media player device can include video processing, audio processing, and other hardware or software that enhances the experience of the user while consuming one or more media streams. In the flow 100, the displaying media streams on a handheld device enables immersive video 129. Immersive video can enable a user to "enter" the video in the sense that the user can travel into the video; look up, down, left, or right within the video; and so on. In embodiments, the immersive video experience can enable virtual reality (VR), augmented reality (AR), mixed reality (MR), etc., viewing.

The flow 100 includes determining an orientation 130 of the handheld device during playback of at least one of the one or more media streams on the handheld device. The orientation of the handheld device can be determined within a three-dimensional space. The handheld device can be lying "display up" on a table, can be held by a user, and so on. The handheld device can be oriented in a substantially vertical orientation (e.g. 90 degrees or perceived by the user to be 90 degrees), a substantially horizontal orientation (e.g. 0 degrees or perceived by the user to be 0 degrees), or at an angle between vertical and horizontal. The handheld display can be tipped forward or backward. The orientation of the handheld device can include an elevation above a surface such as a desk, a floor, and the like. The orientation of the handheld device can be determined using rectangular coordinates, cylindrical coordinates, spherical coordinates, etc. The orientation of the device can be determined in degrees, radians, etc. The orientation of the handheld device can be determined using motion sensors included in the handheld device (discussed below). In the flow 100, the orientation of the handheld device is determined using implicit orientation 135. Along with position of the handheld device, the implicit orientation of the device can be used to determine object pose. The pose of the handheld device can be determined based on an image of the user holding the handheld device. An implicit orientation can be determined based on a relative change from a starting point, rather than using actual physical coordinates and directions.

The flow 100 includes detecting a change in the orientation 140 of the handheld device, where the change occurs during playback of the at least one of the one or more media streams. A change in orientation of the handheld device can include a user picking up the device; tilting the top edge of device away from or toward the user; pushing the side edge of the device away from or toward the user, and so on. The detecting a change in the orientation of the handheld device can include rotating the device clockwise or counterclockwise. The change in orientation of the handheld device can include a combination of pushing, tilting, rotating, and so on. The detecting a change in orientation can include detecting a change from a substantially vertical orientation of the handheld device to a substantially horizontal orientation, or vice versa. The flow 100 includes calculating a rotation angle 150 of the handheld device, based on the detecting. The rotation angle can be determined based on rotation within a 3D space, where the 3D space can be described using a coordinate system. For example, the rotation angle can be determined based on x, y, and z coordinates. Using x, y, z coordinates, the rotation angle can be determined based on rotation about the z-axis such as pushing the side edge of the display away from or toward the user; about the x-axis such as rotation clockwise or counterclockwise; about the y-axis such as tilting the top edge of the display away from or toward the user; etc. The angle of rotation can include rotations about multiple axes. In embodiments, the calculating the rotation angle can be based on one or more motion sensors included in the handheld device. The motion sensors can detect position, rotation, acceleration, and so on. In embodiments, the motion sensors comprise a gyroscope, an accelerometer, a gravity sensor, or a magnetic field sensor within the handheld device. In the flow 100, the rotation angle is used to generate a rotation metric 155. The rotation metric can include a quality of the rotation such as the orientation of a handheld device being vertical, or the orientation of the handheld device being horizontal. The rotation metric can include an amount of change of a rotation angle such as a small change, a medium change, a large change, and the like. The rotation metric can be applied to a variety of calculations and renderings associated with the one or more media streams. In embodiments, the rotation metric can impact zoom calculations and renderings (discussed below) for the multiple view playback.

The flow 100 includes changing the playback 160 of at least one of the one or more media streams on the handheld device, based on the rotation angle. The orientation of a handheld device can be used to determine how much or how little information, such as media stream information, can be displayed on the handheld device. A handheld device in a vertical orientation can be used to display a video stream, one or more audio streams associated with the video stream, and so on. As the handheld device is rotated to a horizontal orientation, for example, then different display options become available. The flow 100 further includes changing the playback of a combination 162 of two or more media streams, based on the rotation angle. That is, when the handheld device is in a horizontal orientation, then more than one video stream might be displayed on the handheld device. In embodiments, the combination of media streams can be changed from a single view playback in an original orientation to a multiple view playback, based on the rotation angle. The changing can be accomplished by the user rotating her handheld device such as a smartphone, tablet, media player, etc. In embodiments, the original orientation includes a substantially vertical display screen on the handheld device. In a usage example, while the display screen of the handheld device is substantially vertical, then a single view playback can be enabled. In embodiments, the combination can be changed from a multiple view playback in an original orientation to a single view playback, based on the rotation angle. This change in combination can again be accomplished by rotating the handheld device. In embodiments, the original orientation includes a substantially horizontal display screen on the handheld device. In other embodiments, the single view playback can include a single video channel and a single audio channel and the multiple view playback can include a plurality of video channels and a corresponding plurality of audio channels. The single view playback or the multiview playback need not be limited to a single (e.g. monaural) channel per video channel. In other embodiments, the single view playback can include a single video channel and a pair of audio channels, wherein the multiple view playback comprises a plurality of video channels and a corresponding plurality of pairs of audio channels. The pairs of channels can be used to enable binaural or stereo sound which can enable encoded sound such as 5.1 channel Surround Sound™, Atmos™, and the like.

In the flow 100, the changing the playback affects a zoom 164 of the one or more media streams. The zooming can be affected by rotation of the handheld device. The zoom calculations can include zooming into the video stream or zooming out of the video stream. The amount of zoom, such as positive zoom to zoom in or negative zoom to zoom out, can be controlled by display tilting, pushing/pulling, rotation, etc. In embodiments, the zoom can result in an extended portion being displayed for the one or more media streams. The extended portion of the media stream can include a portion of the media stream outside a viewport through which the media stream was presented before the changing. The flow 100 includes obtaining captions 166 related to the one or more media streams. The one or more captions can include a transcription of an audio channel, a translation, a description, and so on. The caption can include directions, song lyrics, stage queues, dance step names, or other information. Further embodiments include changing the playback of the captions and the one or more media streams, based on the rotation angle. The changing the playback of a caption can include showing the caption, hiding the caption, etc. In embodiments, the caption can be removed when the handheld device is substantially vertical. Removing the caption can enable the viewing to enjoy the video and audio streams without distraction. In other embodiments, the caption can be displayed when the handheld device is substantially horizontal. Adding the caption can provide a translation of the audio, clear lyrics during a portion of a song, especially a portion that is difficult to hear, garbled, etc. A received caption or a combination 162 of received captions can be used to change the media stream playback 160.

In the flow 100, an additional audio stream is added 168 to the playback, based on the rotation angle. The additional audio stream can include audio from additional people who can appear within the audio stream after device rotation, audio from musical instruments that are included after handheld device rotation, and the like. The flow 100 further includes filling extended portions 170 of the at least one of the one or more media streams with video image data. In a usage example, a user watches a zoomed video stream on her handheld device. The user then "looks right" within the video stream. Since the view to the right in the video stream was previously blocked by the viewport, then information that includes the view to the right is filled into the video stream. When the video data is available, then the filling comprises video image data. When video image data is not available, then data can be generated or synthesized. In embodiments, the filling can be accomplished by generating the video image data by image processing. The generating video image data can be accomplished using extrapolation techniques, synthesis techniques, and so on. In embodiments, the filling can cover peripheral regions of a video display beyond content contained in the at least one of the one or more media streams. The covering peripheral regions can include regions that go out of view as the handheld device is rotated. In other embodiments, the peripheral regions can be exposed, based on the rotation angle. In a usage example of covering and exposing, a user pans her view of a video stream left to right by rotating the handheld device. Peripheral regions to the left can be covered, while peripheral regions to the right are exposed.

Further embodiments can include detecting a further change in the orientation of the handheld device, wherein the further change indicates a return toward the orientation that was initially determined, and wherein volume of the additional audio stream is diminished, based on a magnitude of the return. The detecting further change in the orientation of the handheld device can be used to pause media streams or to stop media streams. The detecting further change can be used to make adjustments to the playback of single video channels or playback of combined, multiple video channels.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
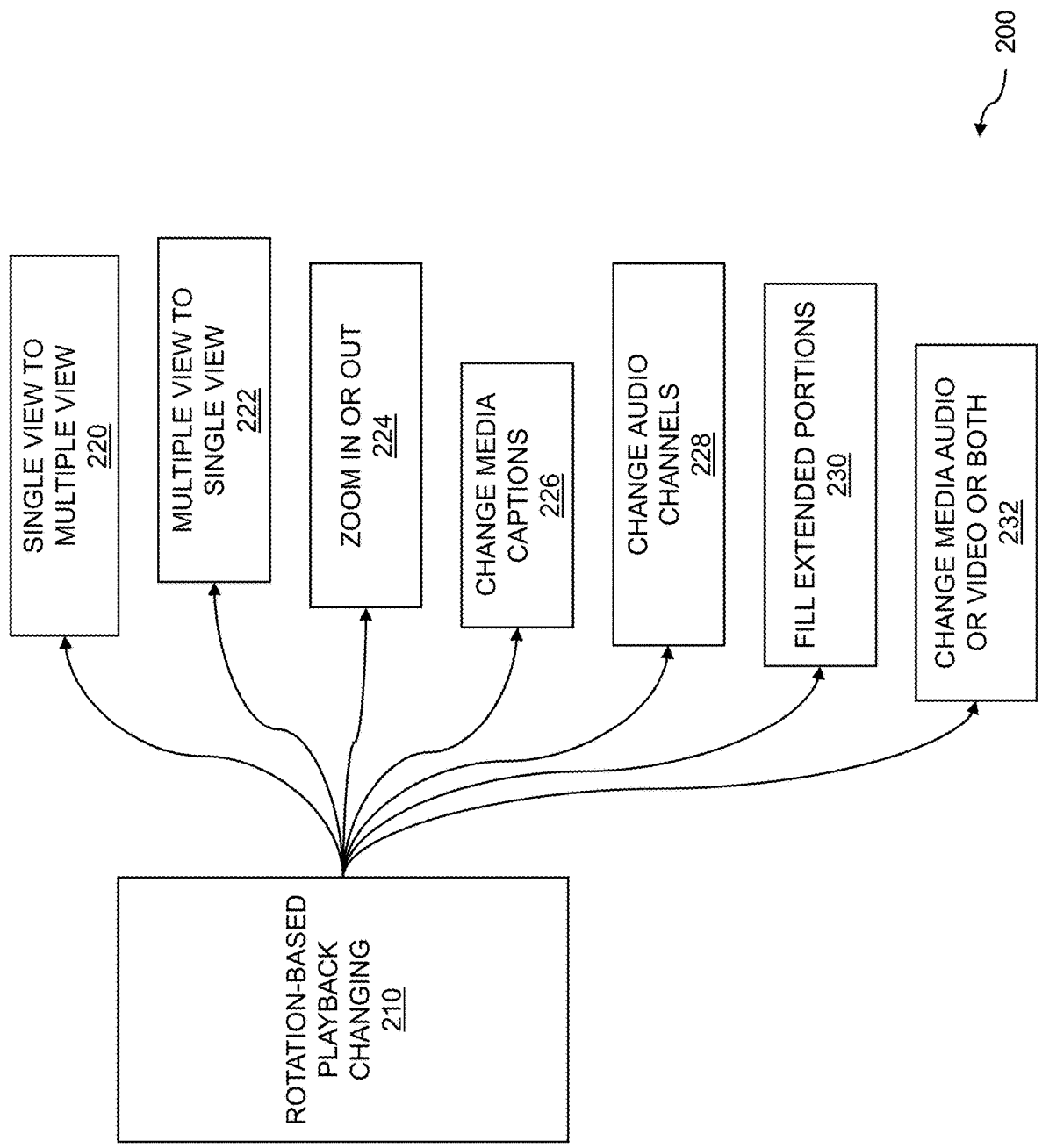
FIG. 2 is a flow diagram for rotation-based playback changing.

FIG. 2 is a flow diagram for rotation-based playback changing. One or more media streams can be played back on a handheld device used for media stream playback. The playback of one or more media streams can be changed based on orientation of the handheld device. The orientation of the handheld device can include a substantially vertical orientation, a substantially horizontal orientation, or an orientation at an angle between vertical (90 degrees) and horizontal (0 degrees). The orientation of the handheld device can be changed by rotating the device, tilting the device, and so on. Rotation-based playback changing enables audio and video stream rendering modification based on a device rotation metric. One or more media streams from a server, where the media streams are targeted for display on a handheld media stream playback device. An orientation of the handheld device is determined during playback of at least one of the one or more media streams on the handheld device. A change in the orientation of the handheld device is detected, where the change occurs during playback of the at least one of the one or more media streams. A rotation angle of the handheld device is calculated, based on the detecting. The playback of at least one of the one or more media streams is changed on the handheld device, based on the rotation angle.

The flow 200 includes changing the playback 210 of at least one of the one or more media streams on the handheld device, based on the rotation angle. The changing can be based on an amount of rotation, a speed of rotation, and so on. The changing can be based on a threshold, a value, a range of values, a qualification, preferences of an individual, and the like. The media streams that are played back can include a subset of media streams, where the subset of media streams can be selected by a user; recommended based on a view count, an engagement score, analysis of the video; etc. Embodiments include changing the playback of a combination of two or more media streams, based on the rotation angle. The changing the playback can include combining or removing media streams, starting and stopping media streams, etc. In the flow 200, the combination is changed from a single view playback 220 in an original orientation to a multiple view playback, based on the rotation angle. The original orientation can include a substantially vertical orientation or a substantially horizontal orientation. In embodiments, the original orientation can include a substantially vertical display screen on the handheld device. The vertical display can be used for playback of a single media stream. A single view playback can be based on more than one media stream. For example, a single view playback can include one or more video streams, one or more audio streams, a text stream, and so on. In embodiments, the single view playback can include a single video channel and a single audio channel. Discussed below and throughout, a multiple view playback can include a plurality of video channels and a corresponding plurality of audio channels. A single audio channel can enable monaural audio; two audio channels can enable binaural audio, stereo audio, and so on. In embodiments, the single view playback can include a single video channel and a pair of audio channels, wherein the multiple view playback comprises a plurality of video channels and a corresponding plurality of pairs of audio channels.

In the flow 200, the combination of media streams can be changed from a multiple view playback 222 in an original orientation to a single view playback, based on the rotation angle. The orientation of the handheld device can be changed by a user rotating the handheld device. In embodiments, the original orientation can include a substantially horizontal display screen on the handheld device. The user can cause the change from a multiple view playback to a single view playback by rotating the handheld device from a substantially horizontal orientation to a substantially vertical orientation. In the flow 200, the changing the playback affects a zoom 224 of the one or more media streams. A zoom can include a zoom in or a zoom out. The zoom can also affect how a media stream is played back. In embodiments, the zoom can result in an extended portion being displayed for the one or more media streams. The extended portion can include a full-length portion of the media stream (long-form video), a slow motion ("slo-mo") version of the media stream, etc. The flow 200 includes obtaining a caption 226 related to the one or more media streams. The captions can include closed captions, subtitles, song lyrics, subtitles for the deaf and hard of hearing (SDH) which include scene descriptions and non-speech features, etc. Embodiments can include changing the playback caption and the one or more media streams, based on the rotation angle. In a usage example, captions can be played back when the handheld device is in an orientation, and the captions can be hidden when the handheld device is in another orientation. In embodiments, the caption is displayed when the handheld device is substantially horizontal. In other embodiments, the caption can be removed when the handheld device is substantially vertical.

The flow 200 includes changing audio channels 228. Recall that one or more audio channels can be associated with a single video channel for a single view playback. A single audio channel can enable monaural audio, two audio channels can enable binaural or stereo audio, etc. Embodiments include changing the single view playback comprising a single video channel and a single audio channel to a multiple view playback comprising a plurality of video channels and a corresponding plurality of audio channels. The changing audio channels can include changing the single view playback comprising a single video channel and a single audio channel to a single view playback comprising a single video channel and two or more corresponding audio channels. In embodiments, the single view playback comprises a single video channel and a pair of audio channels.

The flow 200 includes filling extended portions 230 of the at least one of the one or more media streams. The filling extended portions of a media stream such as a video stream can enable a user to "look around" within the video stream. That is, the user could look to the left or right, look up or down, move "into" the video by moving forward, back out of the video by moving backward, and so on. The filling extended portions can be based on real data, generated or synthetic data, and so on. Embodiments further include filling extended portions of the at least one of the one or more media streams with video image data. The video image data can include image data that is outside a viewport used for playing back media streams on a handheld device. The viewport can crop the media stream to fit the display of the handheld device. If the user pans outside the viewport, such as panning right, then video image data from the video stream can be used for filling extended portions. In other embodiments, the filling can be accomplished by generating the video image data by image processing. The generating video image data can be accomplished using extrapolation techniques, image synthesizing techniques, and the like. In embodiments, the filling can cover peripheral regions of a video display beyond content contained in the at least one of the one or more media streams. The covering the peripheral regions can be accomplished using a mask, a frame, and so on. In other embodiments, the peripheral regions can be exposed, based on the rotation angle.

The flow 200 includes changing media audio, changing media video, or changing media audio and media video 232. The changing media audio can include adding or deleting audio streams. In embodiments, an additional audio stream can be added to the playback, based on the rotation angle. Adding audio streams can be used to represent audio within a 2D or a 3D space. In embodiments, the changing the playback enables an immersive video experience. The changing video streams associated with the immersive video experience can be used to represent movement within a multidimensional space. In embodiments, the immersive video experience can enable virtual reality (VR) or augmented reality (AR) viewing. The VR or AR viewing can be accomplished using purpose-built audio and video equipment such as headphones, video goggles, and the like. Further embodiments include detecting a further change in the orientation of the handheld device, wherein the further change indicates a return toward the orientation that was initially determined, and wherein volume of the additional audio stream is diminished, based on a magnitude of the return. Returning to the originally determined orientation of the handheld device can be used to pause a single or multiple view playback, to end a playback, etc.

Figure 3:
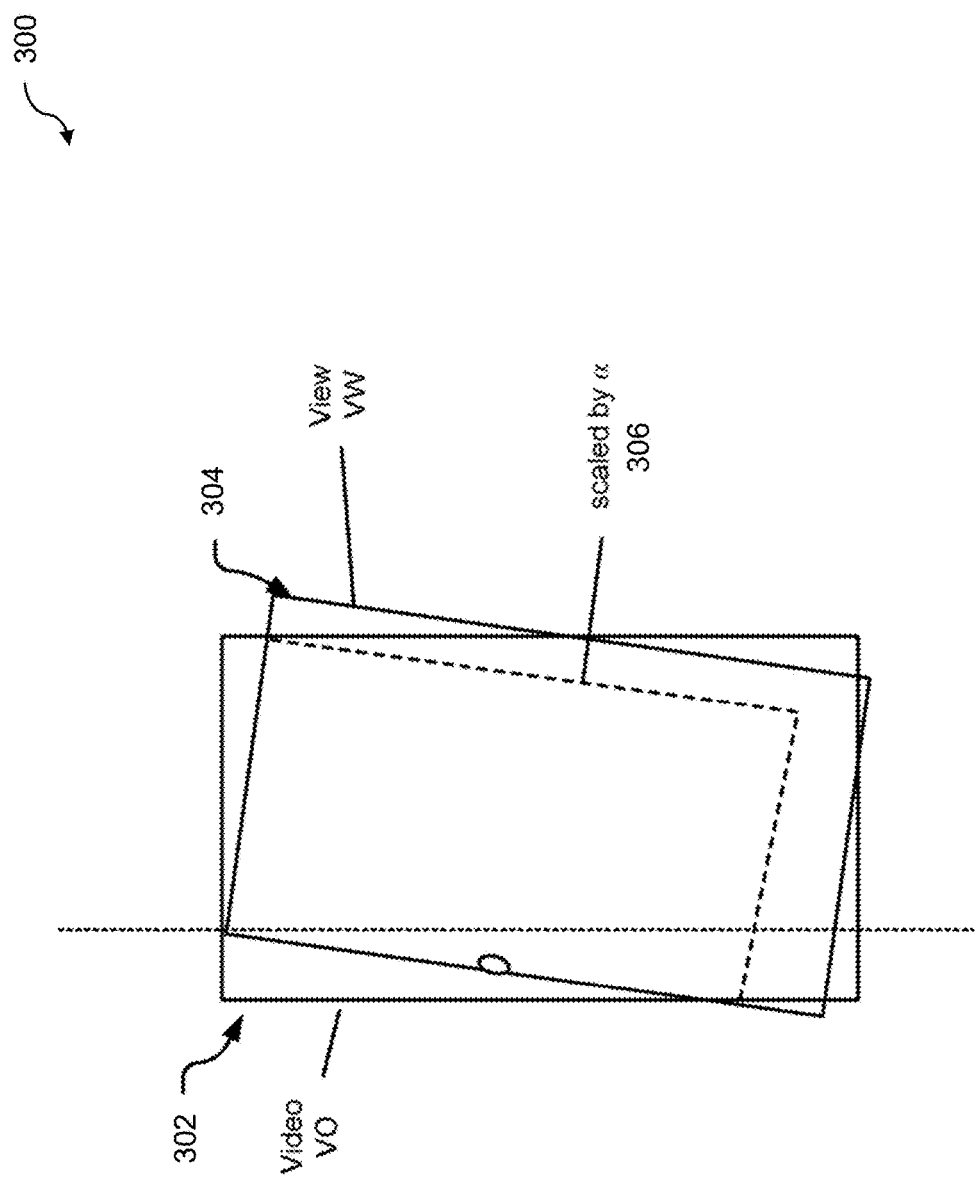
FIG. 3 illustrates an example configuration of a viewing system disclosed herein as transformed into a geometric problem.

FIG. 3 illustrates an example configuration of a viewing system disclosed herein as transformed into a geometric problem. The transforming the configuration of the viewing system into a geometric problem can enable an audio and video stream rendering modification based on a device rotation metric. As a user rotates an electronic device, such as a smartphone, tablet, etc., the view of the video can also rotate. If the video is to remain visible on the display, the rotated video can be scaled so that the video can still be viewed. The transforming of the viewing system into a geometric problem 300 is illustrated in FIG. 3. The video is represented by a rectangle VO 302, and the view of the video is represented by another rectangle VW 304. The rectangle VW can be rotated by an angle θ. Note that the rotated video represented by 304 does not fully overlap the rectangle 302. Thus, the video must be scaled (here, reduced in size) in order to be fully visible within rectangle 302. In the figure, the video can be scaled by a. The scaled video can be placed into VO 306. The video and view can both be standard portrait with 720p (720×1280).

Figure 4:
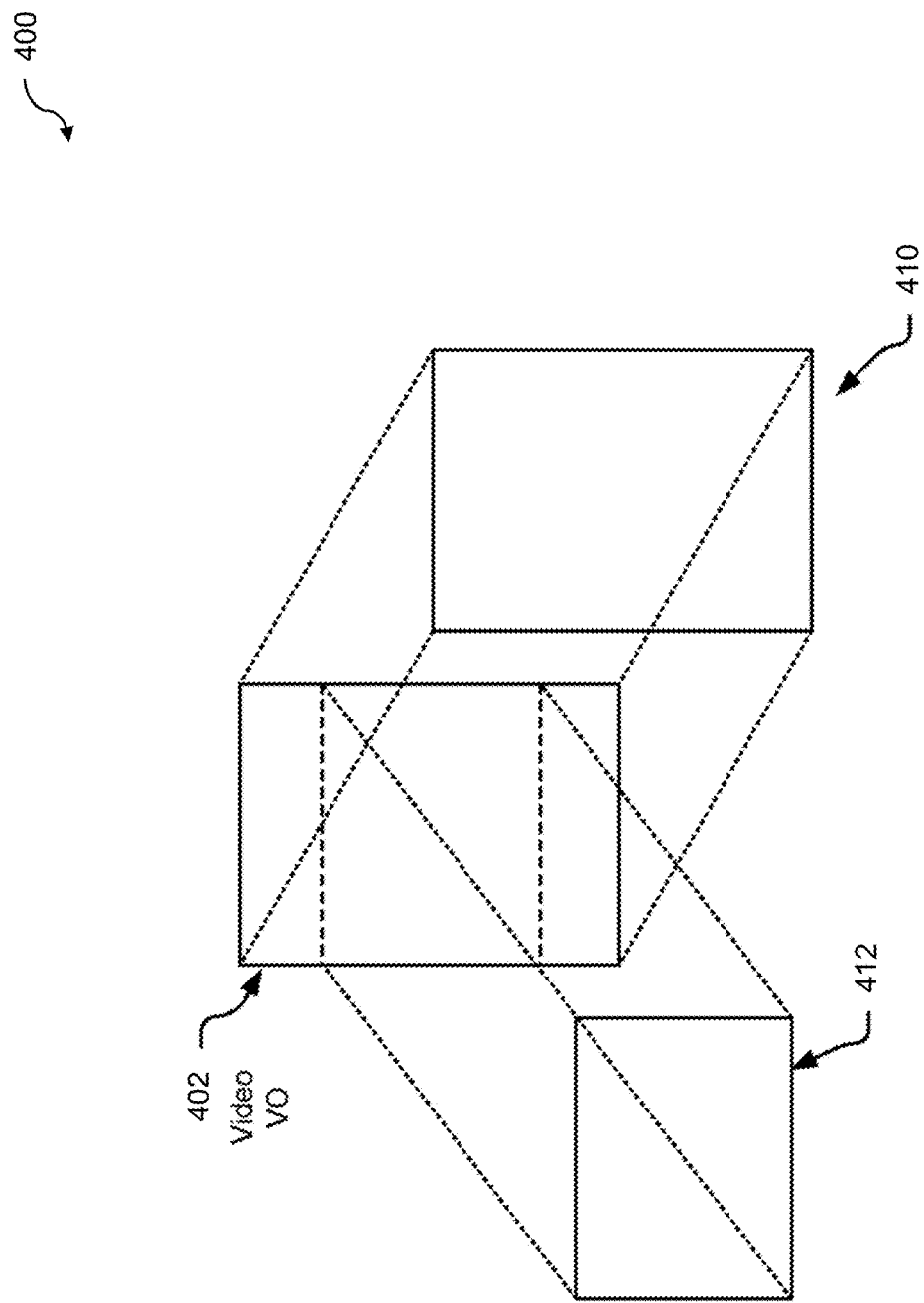
FIG. 4 illustrates an example viewport with the viewport in landscape and portrait modes.

FIG. 4 illustrates an example viewport with the viewport in landscape and portrait modes. A viewport can enhance an audio and video stream rendering modification based on a device rotation metric. FIG. 4 illustrates a viewport 400. A viewport can be oriented in an upright or portrait position. If the viewport is in upright portrait position 410, then no scaling of the video is necessary, and the system can display the original video 402. If the viewport is in a horizontal or landscape position 412, then the video can be scaled. The scaling of the video can include scaling from a (1280×720) to a (720×405) representation in order to fit it in the video into the viewport. The scaling of the video can result in a viewing area that is 31.6% of the original video. A scale of 77.8% can be required to ensure that the viewport remains in bounds of the video. With regard to a zoom factor, dramatic movement within or scaling of the video should be avoided to ensure a smooth viewing experience when the viewer rotates the viewport. Assuming that the maximal and minimal scale is obtained by scanning through all viewing angles for the video, the zoom factor can be defined as the ratio between maximal scale and minimal scale:

Zoom Factor=Maximal Scale/Minimal Scale

Figure 5:
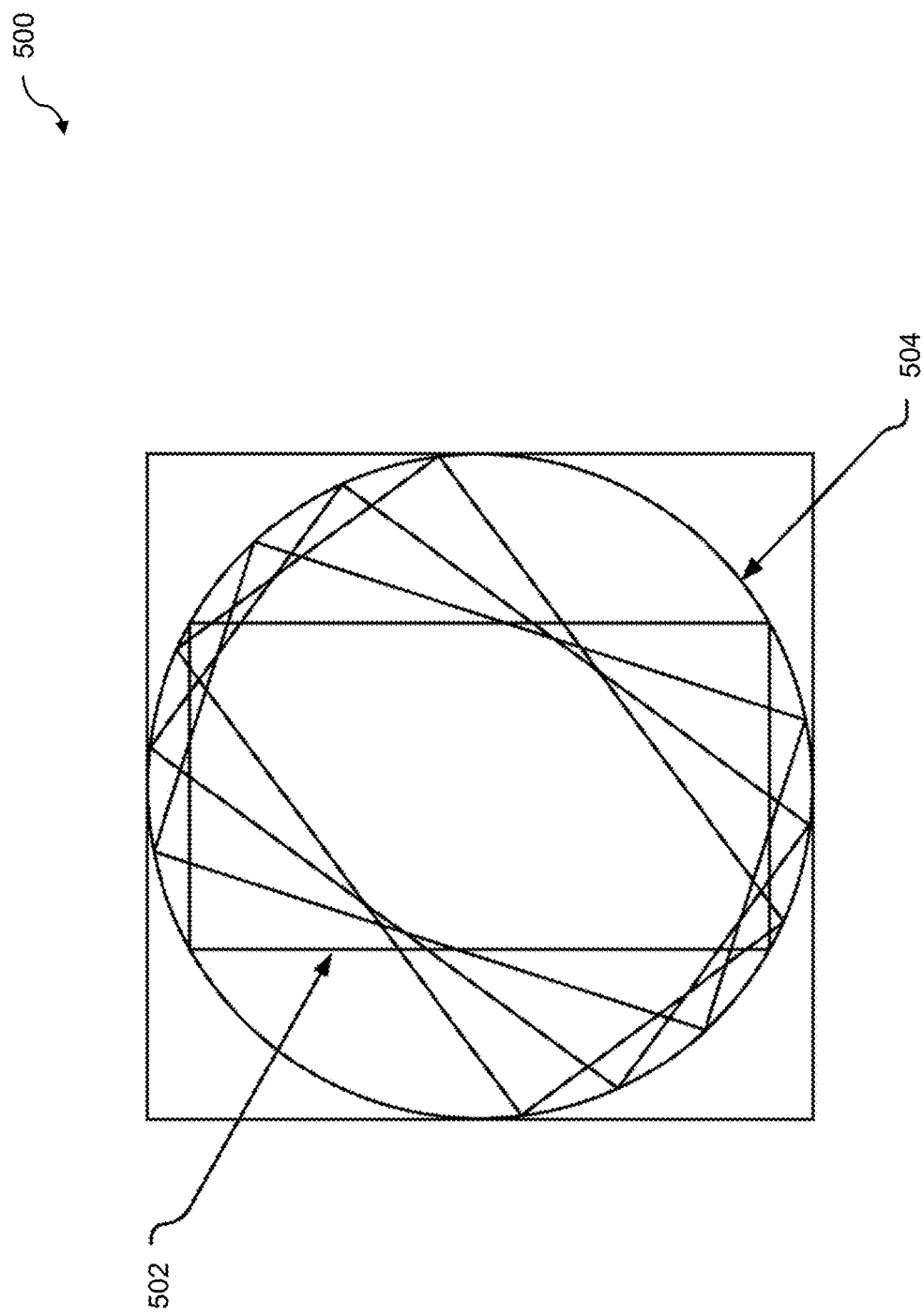
FIG. 5 illustrates an example fixed-orientation video viewing experience by fitting a viewport into an inscribed circle.

FIG. 5 illustrates an example fixed-orientation video viewing experience by fitting a viewport into an inscribed circle. Fitting the viewport into the inscribed circle can enable audio and video stream rendering modification based on a device rotation metric. The fixed-orientation video viewing experience 500 is accomplished by fitting a viewport 502 into an inscribed circle 504 using circle-based rotation. Here, a further boundary condition can be considered. Assuming that the video rectangle VO (discussed previously) is a square, an inscribed circle can be created, and the view rectangle VW (discussed previously) can be scaled in order to fit into the circle. That is, VW becomes an inscribed rectangle to the circle. Note that no scaling is necessary when the system rotates the rectangle within a circle, resulting in a fixed scale, and the zoom factor is equal to 1. That is, when a square video is recorded, the fixed-orientation video viewing experience can be easily achieved by fitting the viewport into an inscribed circle. Given a non-square video, the video can be trimmed into a square video. However, significant parts of the video may be cropped out as a result of trimming.

Figure 6:
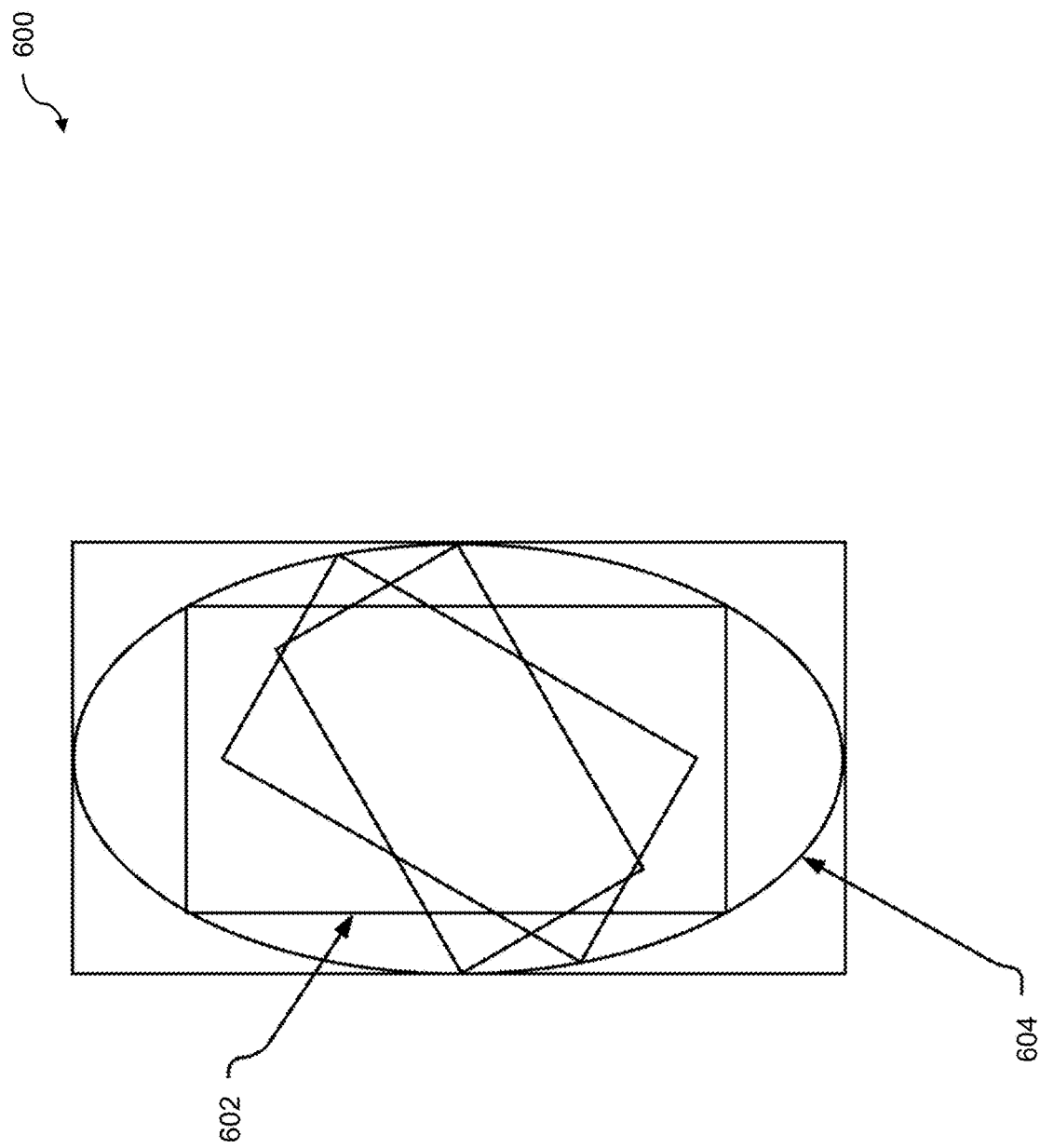
FIG. 6 illustrates an example inscribing of a rectangle-sized video to an oval.

FIG. 6 illustrates an example 600 inscribing of a rectangle sized video 602 to an oval 604. Inscribing the rectangular video into the oval can enable audio and video stream rendering modification based on a device rotation metric. In this oval-based rotation, instead of cropping the wide side of the rectangle and rotating on the circle, the inscribed oval 604 of the video rectangle VO (discussed previously) can be created. It may no longer be possible to find an inscribed rectangle to the oval at all angles, since not all vertices can stay on the oval. However, the system can still fit the rectangle sized video 602 on the oval 604, which can be inscribed into the oval 604 in a vertical or horizontal orientation and can have at most two vertices on the oval 604 on other angles.

Figure 7:
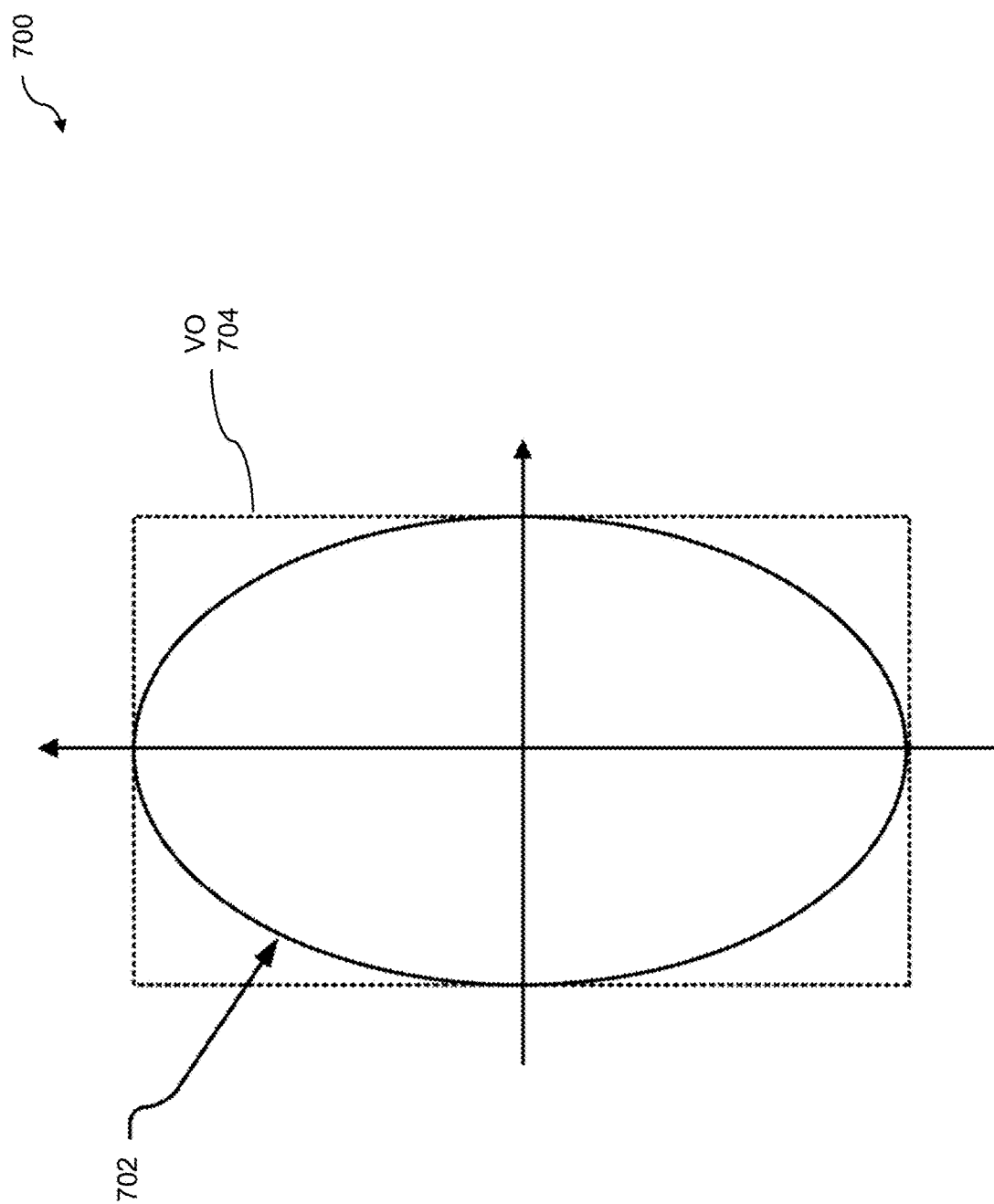
FIG. 7 is an example illustration for fitting a rectangle into an oval.

FIG. 7 is an example illustration for fitting a rectangle into an oval. The fitting a rectangle into an oval 700 can enable audio and video stream rendering modification based on a device rotation metric. Alternatively, the playback technology disclosed herein may fit a rectangular video into an oval 702. The playback technology disclosed herein uses an approach described below to find a minimal scale a, given an oval inscribed to video rectangle VO 704 and a view rectangle VW rotated by θ.

(1) An equation of an oval 702, as illustrated in FIG. 7, may be given by:

$$\frac{x^2}{a^2} + \frac{y^2}{b^2} = 1$$

Where $a=0.5×$video width,$b=0.5×$video height.

(2) On the other hand, four vertices of an upright, non-rotated view rectangle VW 600, as illustrated in FIG. 6, may be defined by:

$w=0.5×$view width,$h=0.5×$view height.

Figure 8:
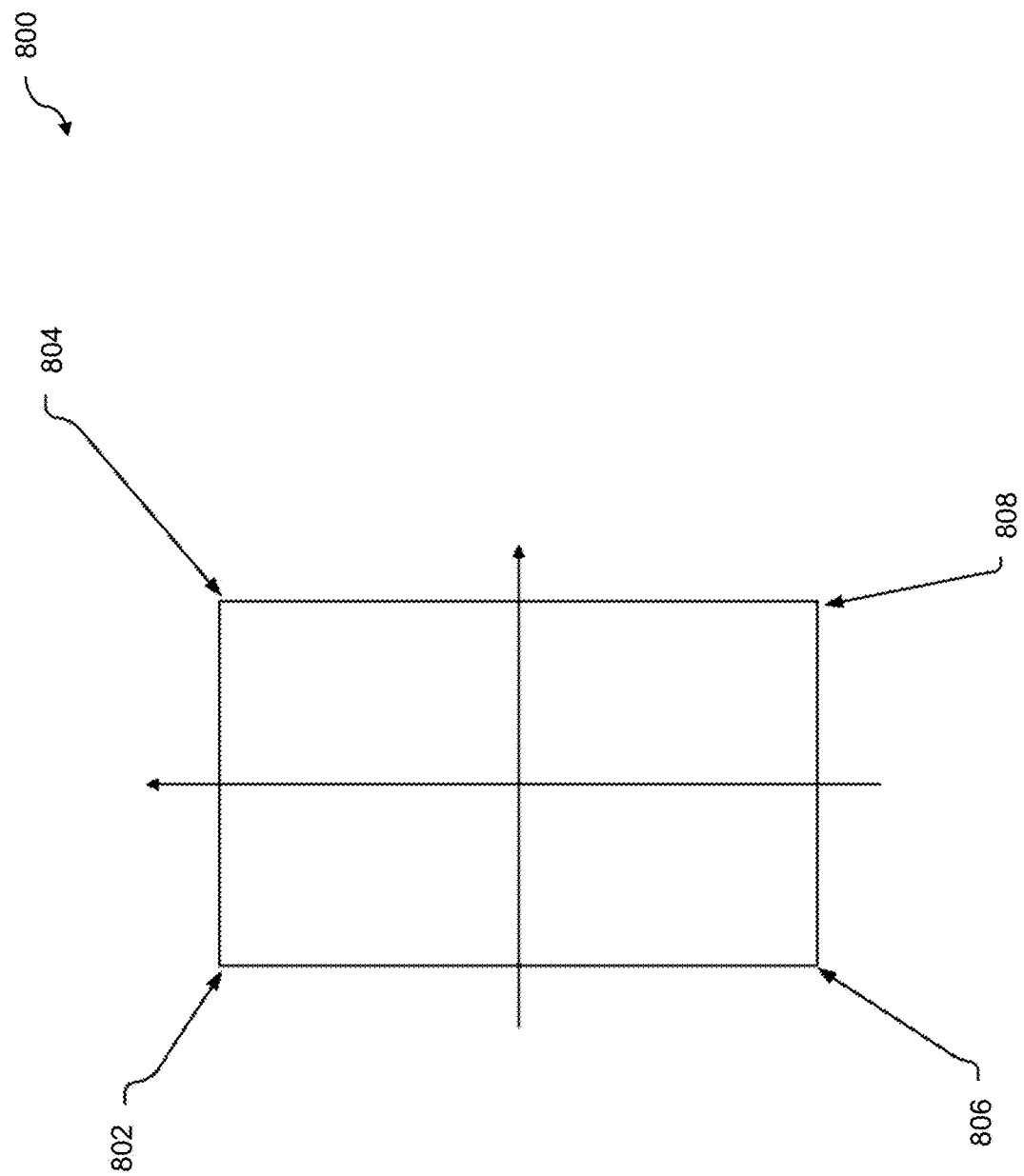
FIG. 8 is an example illustration for calculating position of four vertices of a view rectangle.

(3) FIG. 8 is an example illustration for calculating position of four vertices of a view rectangle. The calculating position of four vertices of a view rectangle can enable audio and video stream rendering modification based on a device rotation metric. When the view rectangle VW 800 is rotated by theta, the four vertices move to:

Top left vertex 802: (−w cos θ+h sin θ, −w sin θ−h cos θ),
Top right vertex 804: (w cos θ+h sin θ, w sin θ−h cos θ),
Bottom left vertex 806: (−w cos θ−h sin θ, −w sin θ+h cos θ), and
Bottom right vertex 808: (w cos θ−h sin θ, w sin θ+h cos θ).

(4) In order to fit the rotated view rectangle VW in the oval, an implementation scales VW by a and re-applies to (3).

$w'=0.5\alpha×$view width,$h'=0.5\alpha×$view hieght (5) By combining 1-4, the minimal scale a can be determined given VO, VW, and the rotating angle θ. For instance, if an implementation wants to make sure the top right vertex should stay within the oval, the equation is:

$$\frac{(0.5\alpha \times \text{view width} \times \cos\theta + 0.5\alpha \times \text{view height} \times \sin\theta)^2}{(0.5 \times \text{video width})^2} + \frac{(0.5\alpha \times \text{view width} \times \sin\theta - 0.5\alpha \times \text{view height} * \cos\theta)^2}{(0.5 \times \text{video height})^2} \leq 1$$

Oval Rotation Method: In an implementation of the video playback technology disclosed herein, the above described geometric framework of designing a rotatable video viewing system is used. The oval gives an alternative mathematical lower bound for the system designer to determine the scaling factor. Based on the Oval Method, the zoom factor is largely reduced. For a typical widescreen portrait video and device of the scale (9:16), the suggested scale is 1.41× at portrait, maxed at 2.04× around 60-degree rotation, and is 1.86× at landscape.

Figure 9:
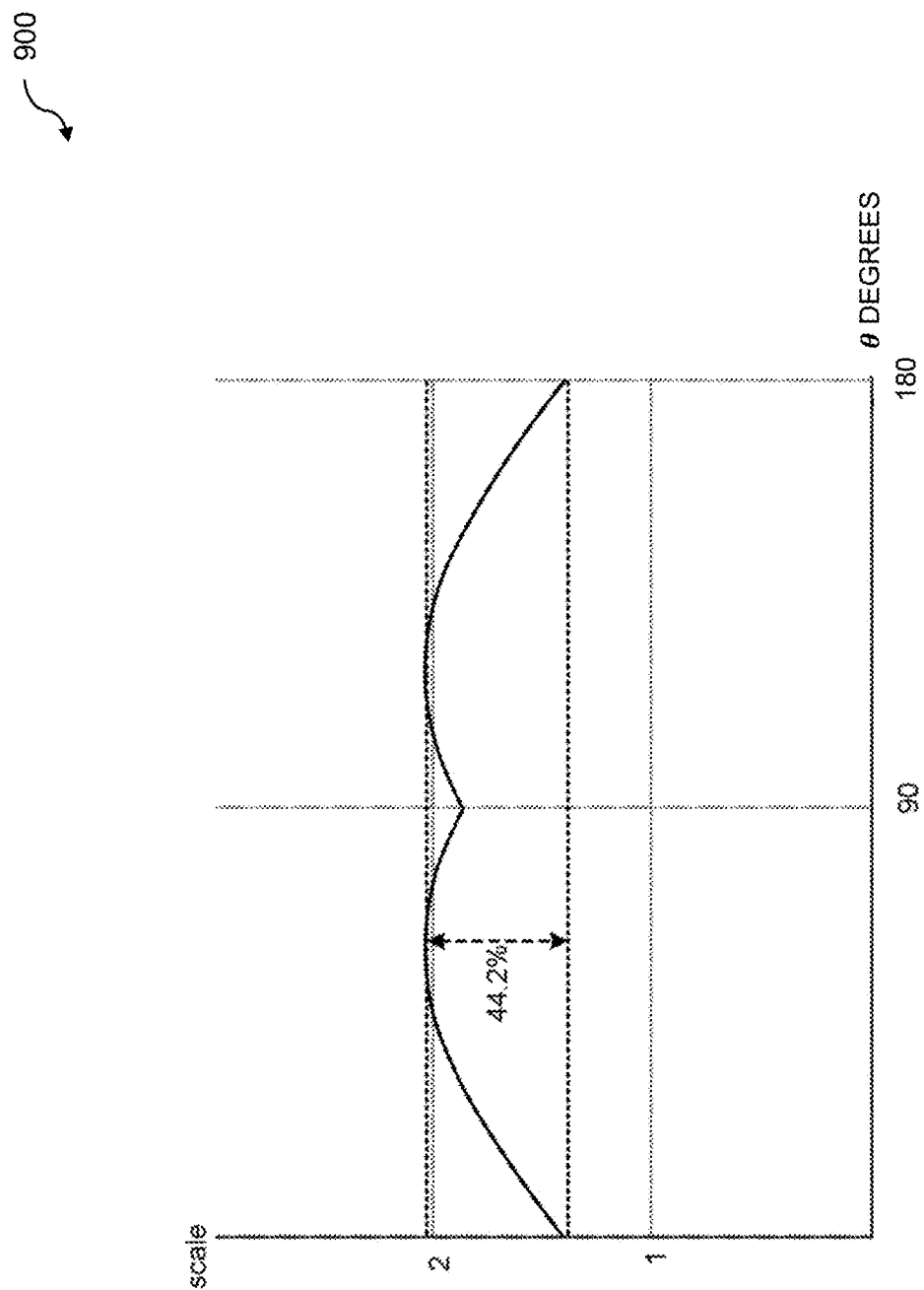
FIG. 9 illustrates an example graph of zoom factor as a function of degree of rotation.

FIG. 9 illustrates an example graph of zoom factor as a function of degrees of rotation. The zoom factor as a function of degrees of rotation can be used to enable audio and video stream rendering modification based on a device rotation metric. As a result, the zoom factor is reduced from 77.8% to 44.2%, as illustrated by a graph 900 in FIG. 9. As a result, the user is less likely to feel uncomfortable in viewing the scaled video.

Given the mathematical lower bound of the scaling factor, an implementation disclosed herein uses an alternative scaling curve as long as it stays in bounds. Additional rendering enhancements are discussed below.

Figure 10:
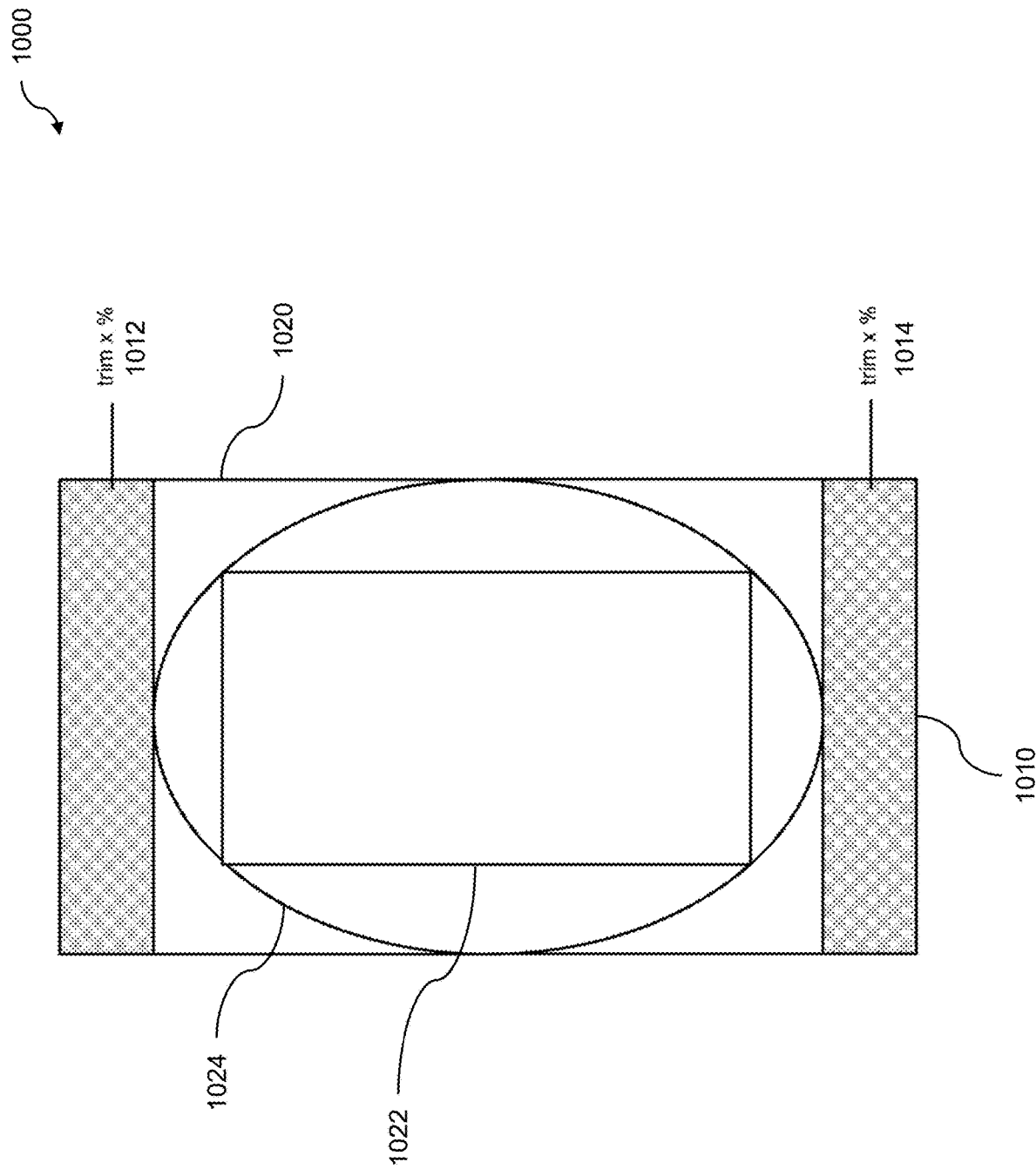
FIG. 10 illustrates trimming of a wide side of a video.

FIG. 10 illustrates trimming of a wide side of a video. Trimming the wide side of the video 1000 by x percent is illustrated by FIG. 10. The trimming of the wide side of the video can enable audio and video stream rendering modification based on a device rotation metric. Video parameters and video display parameters are determined, and a minimum scale factor is calculated to inscribe a rectangle within an oval, based on the height and width of the video. A video 1010, such as a movie, a TV program, a video game, and so on, can include a size, an aspect ratio, a resolution, height and width dimensions, and so on. The dimensions, for example, of the video can be different from the dimensions of a display 1020. In order for the video be viewed on the display, the video can be scaled, altered, cropped, truncated, and so on. Embodiments can include trimming a wide side of the video by a predetermined percentage. Since the focus of the video, such as action within a game, is generally toward the center of the video, the portions or edges such as the wide side of the video can be trimmed. In the figure, the video is trimmed by a percentage toward one edge 1012 and a minimum scale value can be calculated to inscribe a rectangle within an oval based on a height and a width of the video and wherein a height and a width of the video display define the rectangle trimmed by a percentage toward an opposite or opposing edge 1014. Discussed throughout, a minimum scale value can be calculated to inscribe a rectangle 1022 within an oval 1024 based on a height and a width of the video. By trimming the wide side of the video, a visible area of the video can be maximized within the video display. If the individual viewing the video wants to look left or right within the video, the extended portions as the trimmed portions can be filled in with video image data. The video image data can be generated using techniques including image processing, machine learning, etc.

Figure 11:
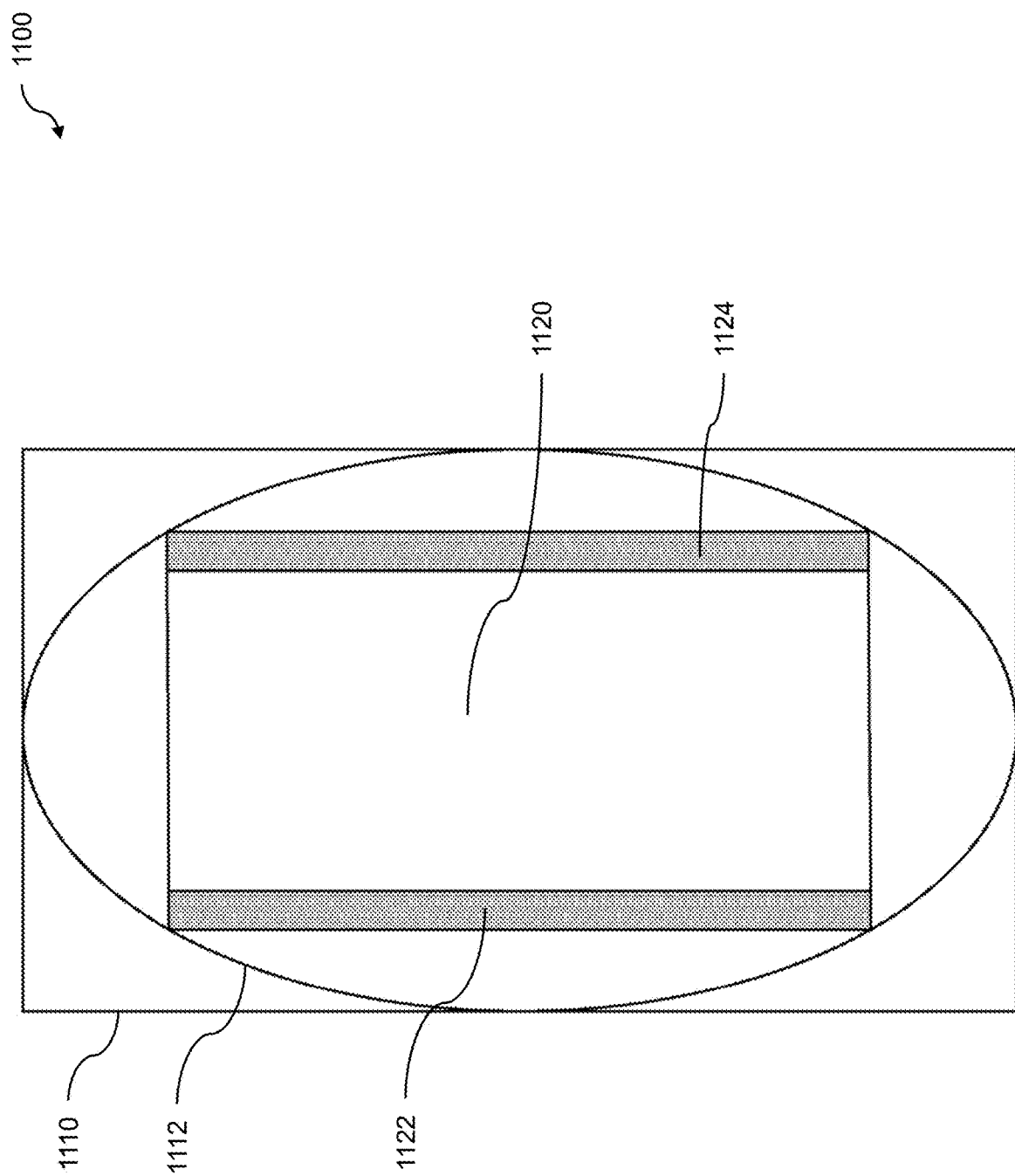
FIG. 11 is an example of pre-zooming and maintaining at a fixed scale with view-around portrait orientation.

FIG. 11 is an example of pre-zooming and maintaining at a fixed scale with a view-around portrait orientation 1100. A video can be pre-zoomed and the fixed scale of the video can be maintained to support audio and video stream rendering modification based on a device rotation metric. A video such as a movie or video game can be shown on a display 1110. The display can include associated parameters such as resolution, dimensions, aspect ratio, and so on, where the parameters of the display are substantially similar to or substantially different from parameters associated with the video. The oval 1112 can be based on the video or a scaled version of the video and can be chosen to maximize a visible area of the video. The video can include a height and a width, an aspect ratio, etc., that are not proportional to the display. That is, the video simply may not be able to be scaled to fit within the oval on the display. In embodiments, the video can be pre-zoomed 1120. The pre-zooming of the video can be maintained throughout viewing of the video by the user. When the aspect ratio of the video is different from the aspect ratio of the display, the video can be masked using masks, such as masks 1122 and 1124.

Figure 12:
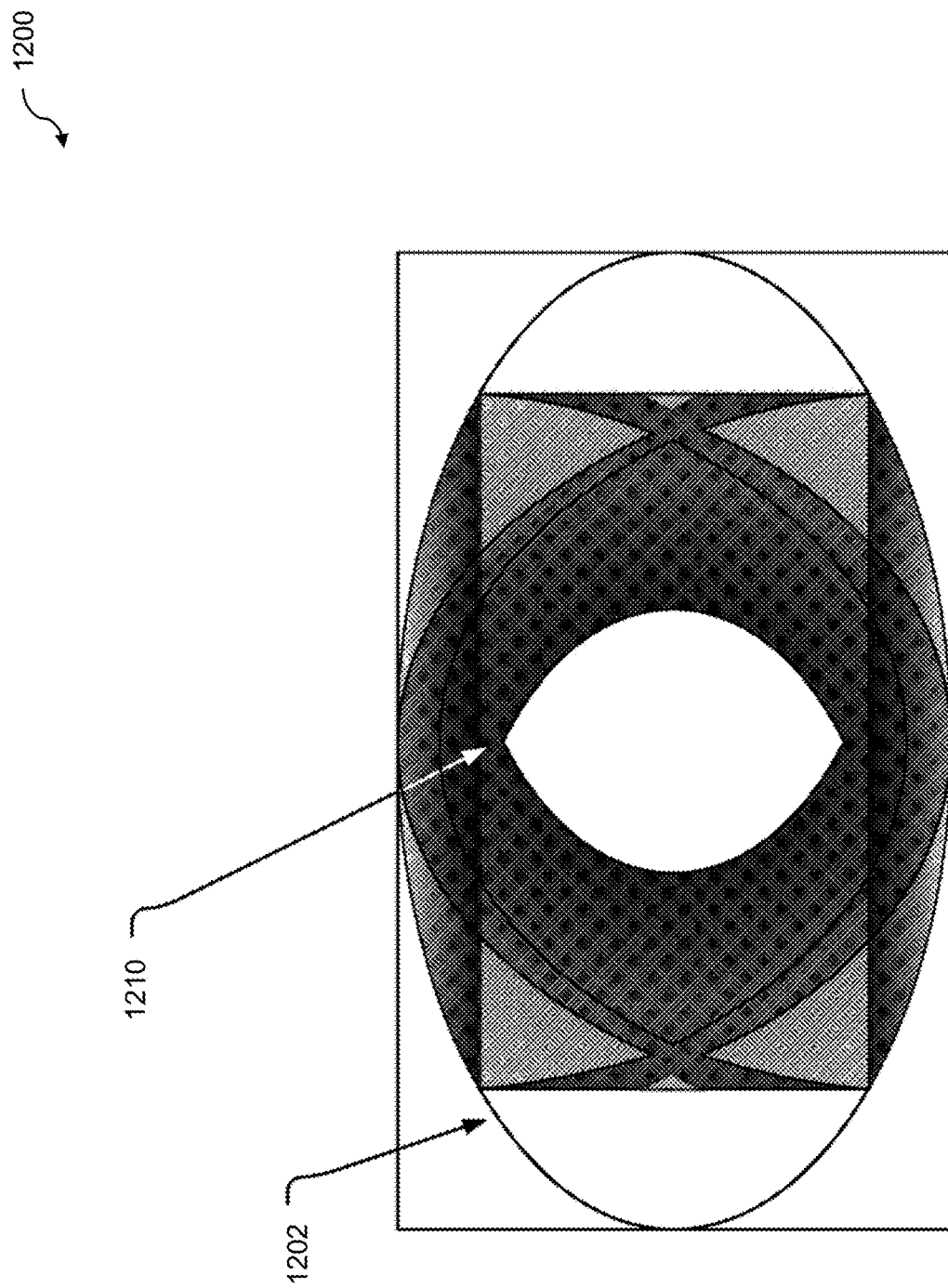
FIG. 12 illustrates overlaying of rotated view angles.

FIG. 12 illustrates overlaying of rotated view angles. Alternatively, the system overlays the rotated view rectangles 1210 in an oval 1202 as illustrated in FIG. 12 to obtain a visible video mask 1200. The mask 1200 may be used as a visual hint for users who record videos, and/or for video compression purposes. For example, the visible video mask 1200 may be communicated to a user so that the user can view a boundary of the visible video mask 1200 when recording a video. For instance, the visible video mask 1200 may be overlaid on a device screen when a user is recording a video.

Figure 13:
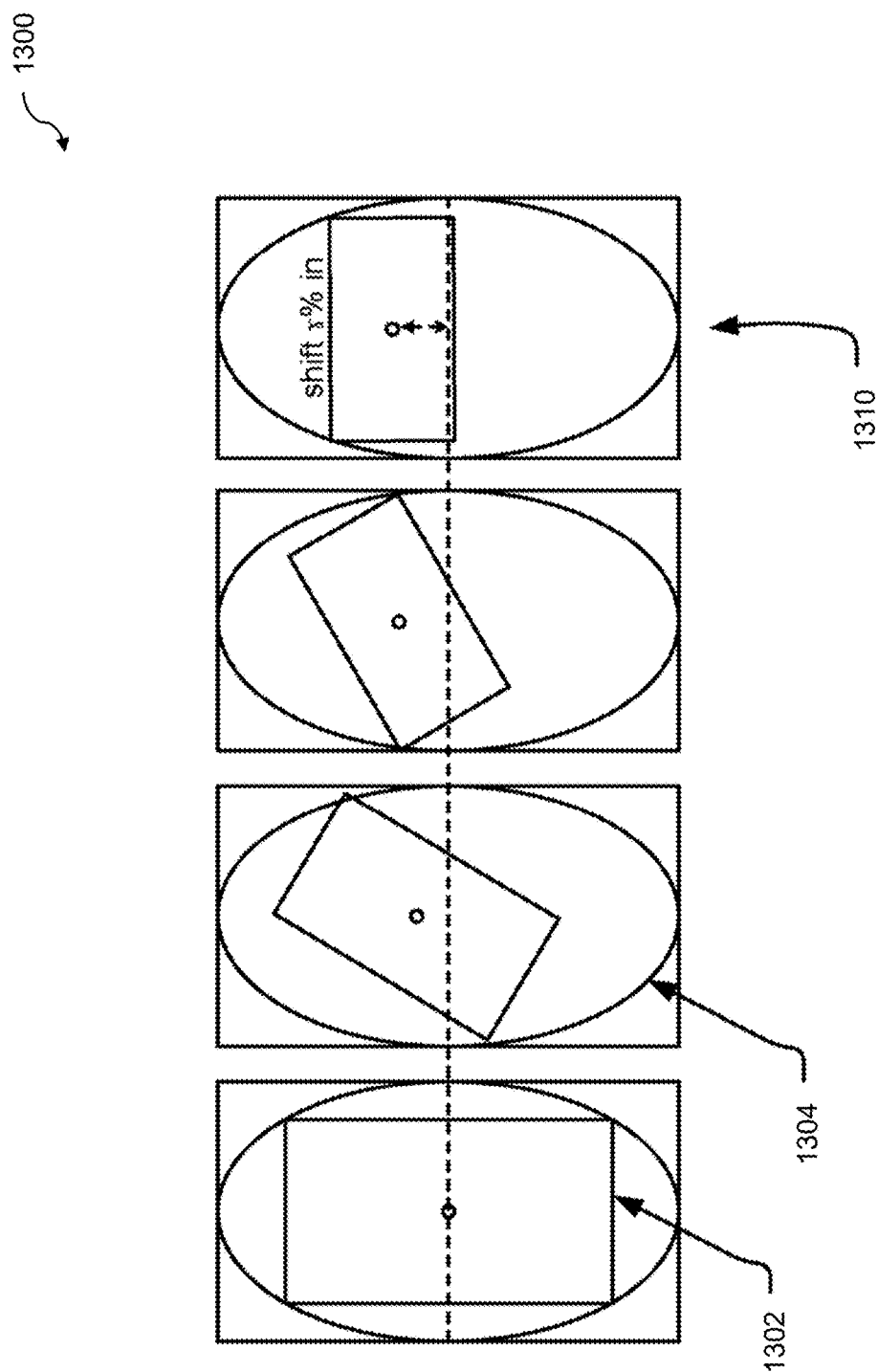
FIG. 13 illustrates rotation of a video off a center of an oval.

FIG. 13 illustrates rotation of a video off a center of an oval. Yet alternatively, the system rotates the video 1302 off a center of an oval 1304 as shown by a series of viewports 1300. For instance, the viewport can be centered at portrait, while shifting upward or downward at landscape as illustrated at 1310. The technique is particularly useful to capture the highlight of the video.

In another implementation, to support off-center rotation, a "Highlight Anchor" can be positioned on the video. In one implementation, the video playback technology disclosed herein allows a user to set the anchor. In another implementation, the video playback technology disclosed herein sets the anchor automatically (by a computer-vision enabled system).

Figure 14:
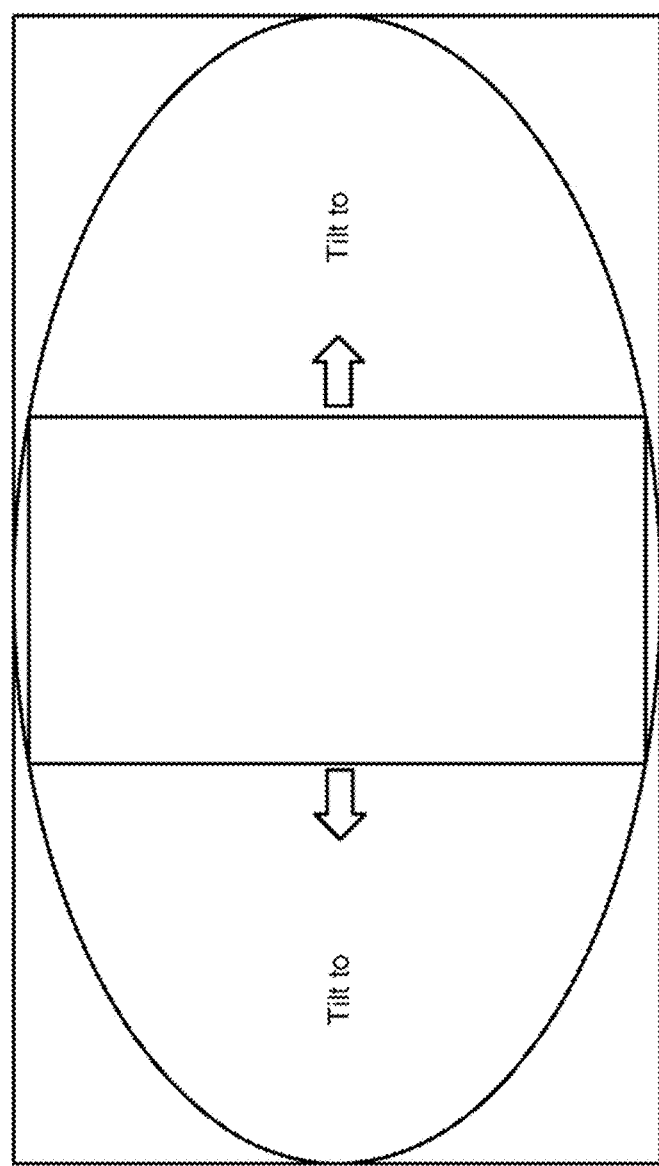
FIG. 14 illustrates movement of viewport that allows a user to tilt or move the viewing device.

FIG. 14 illustrates movement of a viewport that allows a user to tilt or move the viewing device. As the viewport is scaled up (zoomed in) for viewing the video in order to support rotation, viewable margins can exist in one or multiple directions. Therefore, in one implementation, the system allows the user to tilt or move the viewing device to the left, right, up, and down. In such an implementation, the system moves the viewport accordingly as shown in illustration 1400. Here "tilt" is defined as relative motion, whereas "move" is defined as absolute motion. In another implementation, the rotation, movement, and tilting are allowed only after a time set by the video creators.

The video display technology disclosed herein creates a unique video viewing experience in which the user cannot view the entire video in one angle. As a result, the user is motivated to engage in the experience by chasing a moving subject in the video. In one implementation, as only a partial view is visible in the initial view angle, the user is motivated to rotate the viewing device in order to reveal the whole scene within the video.

Furthermore, the video display technology disclosed herein allows a unique storytelling experience for a video creator, who can compose the space and time of the video in various ways to engage the viewers to interact with the video. The engaging viewing experience also represents extensive opportunities for more effective mobile video advertising.

Figure 15:
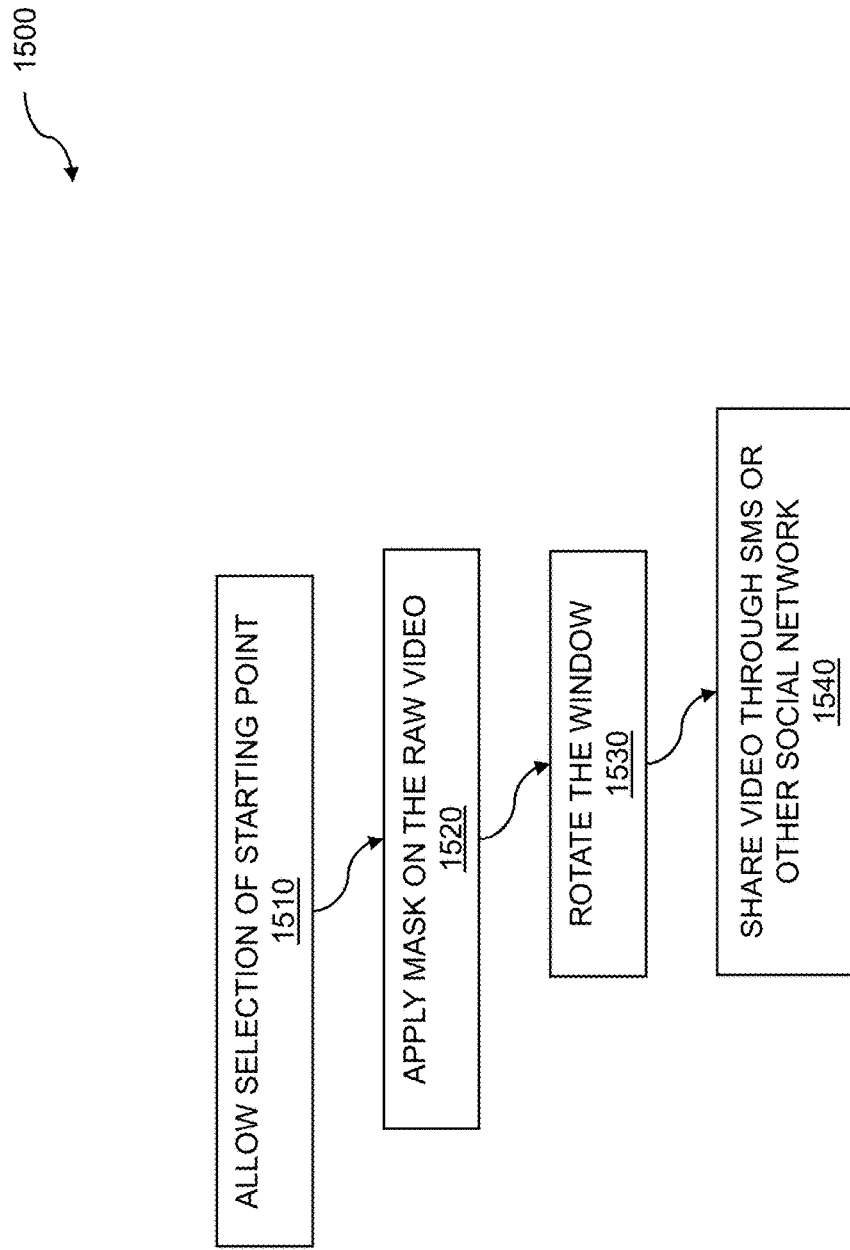
FIG. 15 illustrates example operations of a system for providing an audio and video stream rendering modification based on a device rotation metric.

FIG. 15 illustrates example operations of a system for providing an audio and video stream rendering modification based on a device rotation metric. While the rotating video browsing experience relies on the core algorithm within the specific software, in order for people using a general video browsing software to enjoy a partial experience, the technology disclosed herein provides a special version of the raw video, which can be shared with other people and other software universally. One or more operations 1500 for sharing the video are illustrated in FIG. 15. An operation 1510 allows announcing to one or more friends who want to share the video experience (sharer) to select where they want the rotation to start in the shared version of the video. An operation 1520 applies a mask on the raw video, with a rectangle-shaped window, so that the receiver can view just part of the video, as if using special software to browse the video vertically. Subsequently, depending on the user's selection in operation 1510, at ¼, or ½, or ¾ of the video timeline, an operation 1530 rotates the window in operation 1520 clockwise, as if the receiver can rotate the device and see different parts of the video. Finally, an operation 1540 allows the sharer to distribute the video through short message service (SMS) or other social networks.

When the device is laid flat on the desk, the gravity's direction is perpendicular to the screen, and its projection onto the screen's X and Y axes is very small. Since the core algorithm relies on the X and Y axis readings as input, the input has a very low signal-to-noise ratio (SNR), and a small disturbance to the device may cause the video to rotate significantly, resulting in a negative user experience. To avoid this, an implementation disclosed herein avoids any operation if the X and Y axis readings are below predetermined thresholds X_THRESHOLD and Y_THRESHOLD. The pseudocode for such implementation is as given below:

```
if (gravity.x < X_THRESHOLD && gravity.y < Y_THRESHOLD) {
    return;
} else {
    performCoreAlgorithm( );
}
```

The core algorithm may react very swiftly to a device's altitude change against the gravity. When watched for a long time, a user may feel it hyper-responsive and get motion sick. An implementation disclosed herein reduces the motion sickness by avoiding responding to small turbulence in the altitude change. In such an implementation, whenever the software receives an update from the device's gravity sensor, it applies a low-pass filter (LPF) and uses the LPF output as the input to the core algorithm. The pseudocode for such implementation is as given below:

```
var lpfX = 0.0;
var lpfY = 0.0;
let kFilteringFactor = 0.1;
func onDeviceGravityUpdate(gravity) {
    let lpfX = (gravity.x * kFilteringFactor) + (lpfX * (1.0 -
        kFilteringFactor))
    let lpfY = (gravity.y * kFilteringFactor) + (lpfY * (1.0 -
        kFilteringFactor))
}
```

Figure 16:
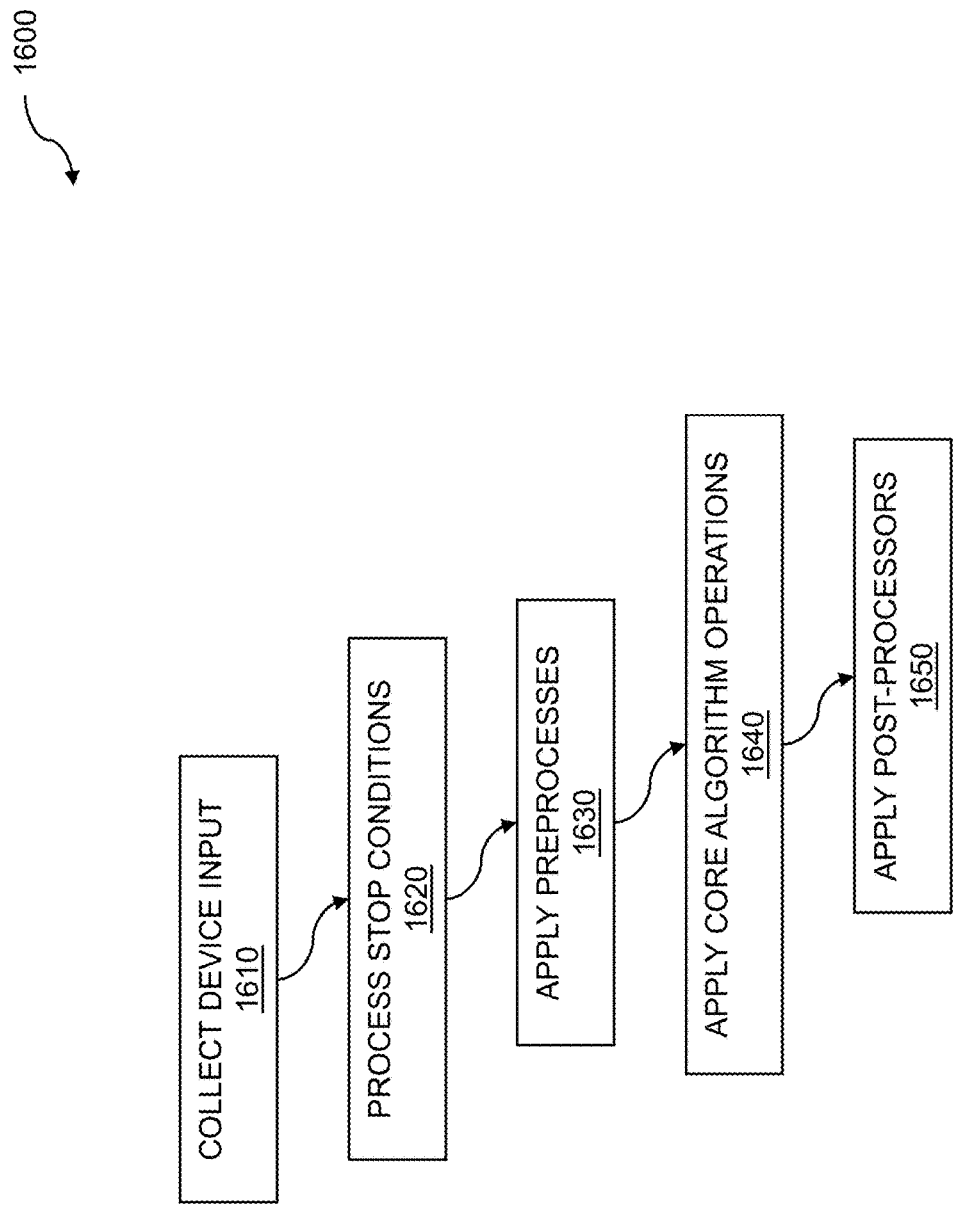
FIG. 16 illustrates alternative example operations of a system for audio and video stream rendering modification based on device rotation metric.

FIG. 16 illustrates alternative example operations of a system 1600 for providing audio and video stream rendering modification based on device rotation metric. An overview of the video playback system is disclosed herein. An operation 1610 collects various device inputs. An operation 1620 processes one or more stop conditions if the device is laid on a horizontal surface. An operation 1630 applies one or more preprocesses including a low-pass filter, a video inset, a viewport inset, etc. An operation 1640 applies various core algorithm operations discussed herein. Subsequently, an operation 1650 applies one or more post-processing operations to smooth the scale of video playback.

Figure 17:
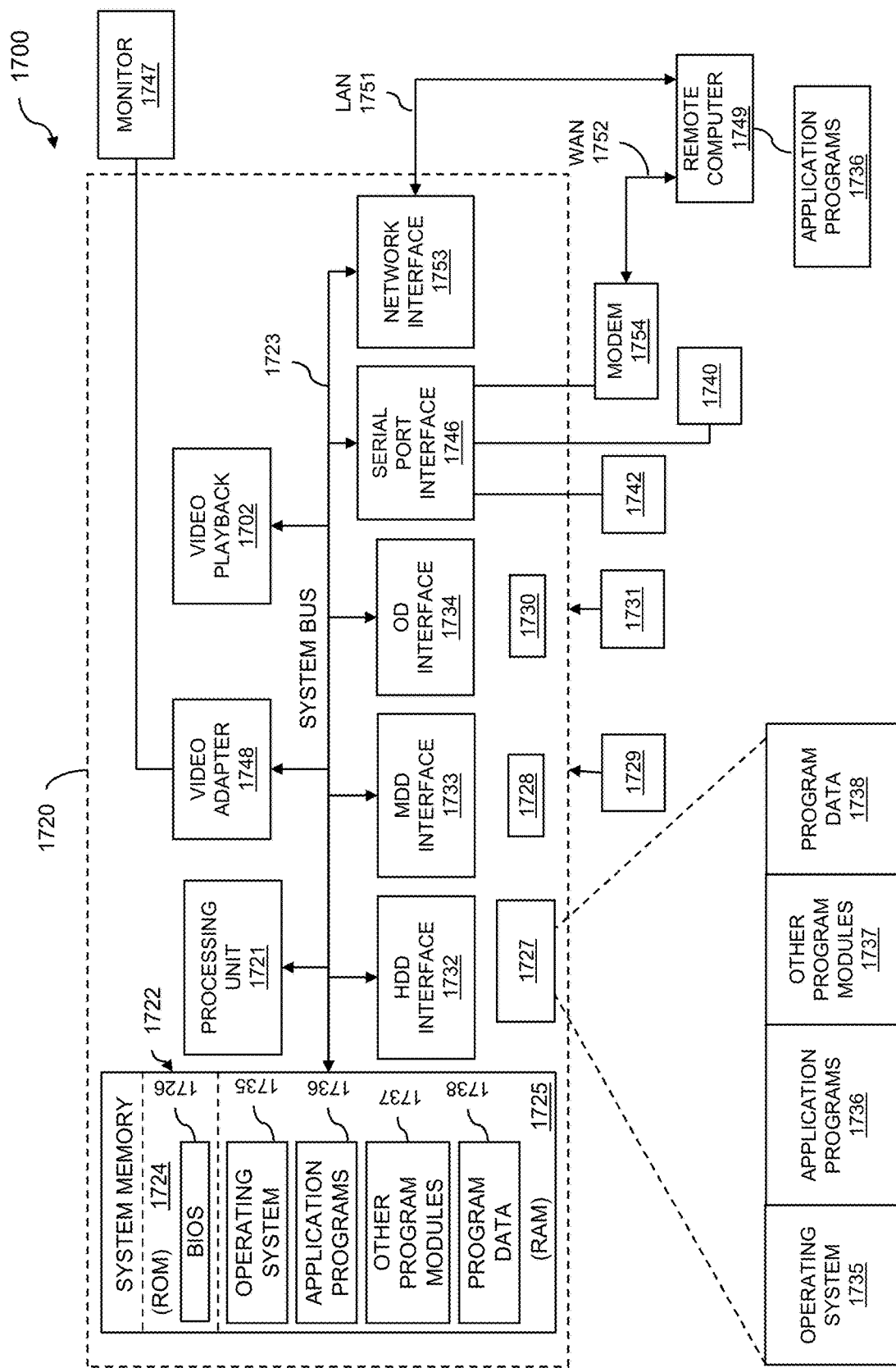
FIG. 17 illustrates an example computing system.

FIG. 17 illustrates an example computing system. The system 1700 may be useful in implementing the described audio and video stream rendering modification based on a device rotation metric. The example hardware and operating environment of FIG. 17 for implementing the described technology includes a computing device, such as a general purpose computing device in the form of a gaming console or computer 1720, a mobile telephone, a personal data assistant (PDA), a set top box, or another type of computing device. In the implementation of FIG. 17, for example, the computer 1720 includes a processing unit 1721, a system memory 1722, and a system bus 1723 that operatively couples various system components including the system memory to the processing unit 1721. There may be only one or there may be more than one processing unit 1721, such that the processor of computer 1720 comprises a single central processing unit (CPU), or a plurality of processing units, commonly referred to as a parallel processing environment. The computer 1720 may be a conventional computer, a distributed computer, or any other type of computer; the implementations are not so limited.

The system bus 1723 may be any of several types of bus structures including a memory bus or memory controller, a peripheral bus, a switched fabric, point-to-point connections, and a local bus using any of a variety of bus architectures. The system memory may also be referred to simply as the memory and includes read only memory (ROM) 1724 and random-access memory (RAM) 1725. A basic input/output system (BIOS) 1726, containing the basic routines that help to transfer information between elements within the computer 1720, such as during start-up, is stored in ROM 1724. The computer 1720 further includes a hard disk drive 1727 for reading from and writing to a hard disk (not shown), a magnetic disk drive 1728 for reading from or writing to a removable magnetic disk 1729, and an optical disk drive 1730 for reading from or writing to a removable optical disk 1731 such as a CD ROM, DVD, or other optical media.

The hard disk drive 1727, magnetic disk drive 1728, and optical disk drive 1730 are connected to the system bus 1723 by a hard disk drive interface 1732, a magnetic disk drive interface 1733, and an optical disk drive interface 1734, respectively. The drives and their associated tangible computer-readable media provide nonvolatile storage of computer-readable instructions, data structures, program modules, and other data for the computer 1720. It should be appreciated by those skilled in the art that any type of tangible computer-readable media which can store data that is accessible by a computer, such as magnetic cassettes, flash memory cards, digital video disks, random access memories (RAMs), read only memories (ROMs), and the like, may be used in the example operating environment. One or more computer instructions for implementing the video playback system 1702 as disclosed herein may be implemented in one of the memories of the computer 1720.

A number of program modules may be stored on the hard disk, magnetic disk 1729, optical disk 1731, ROM 1724, or RAM 1725, including an operating system 1735, one or more application programs 1736, other program modules 1737, and program data 1738. A user may enter commands and information into the personal computer 1720 through input devices such as a keyboard 1740 and pointing device 1742. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 1721 through a serial port interface 1746 that is coupled to the system bus, but may be connected by other interfaces, such as a parallel port, game port, or a universal serial bus (USB). A monitor 1747 or other type of display device is also connected to the system bus 1723 via an interface, such as a video adapter 1748. In addition to the monitor, computers typically include other peripheral output devices (not shown), such as speakers and printers.

The computer 1720 may operate in a networked environment using logical connections to one or more remote computers, such as remote computer 1749. These logical connections are achieved by a communication device coupled to or a part of the computer 1720; the implementations are not limited to a particular type of communications device. The remote computer 1749 may be another computer, a server, a router, a network PC, a client, a peer device or other common network node, and typically includes many or all of the elements described above relative to the computer 1720, although only a memory storage device has been illustrated in FIG. 17. The logical connections depicted in FIG. 17 include a local-area network (LAN) 1751 and a wide-area network (WAN) 1752. Such networking environments are commonplace in office networks, enterprise-wide computer networks, intranets and the Internet, which are all types of networks.

When used in a LAN-networking environment, the computer 1720 is connected to the local network 1751 through a network interface or adapter 1753, which is one type of communications device. When used in a WAN-networking environment, the computer 1720 typically includes a modem 1754, a network adapter, a type of communications device, or any other type of communications device for establishing communications over the wide area network 1752. The modem 1754, which may be internal or external, is connected to the system bus 1723 via the serial port interface 1746. In a networked environment, program engines depicted relative to the personal computer 1720, or portions thereof, may be stored in the remote memory storage device. It is appreciated that the network connections shown are examples and other means of and communications devices for establishing a communications link between the computers may be used.

In an example implementation, software or firmware instructions and data for providing a search management system, various applications, search context pipelines, search services, a service, a local file index, a local or remote application content index, a provider API, a contextual application launcher, and other instructions and data may be stored in memory 1722 and/or storage devices 1729 or 1731 and processed by the processing unit 1721.

Figure 18:
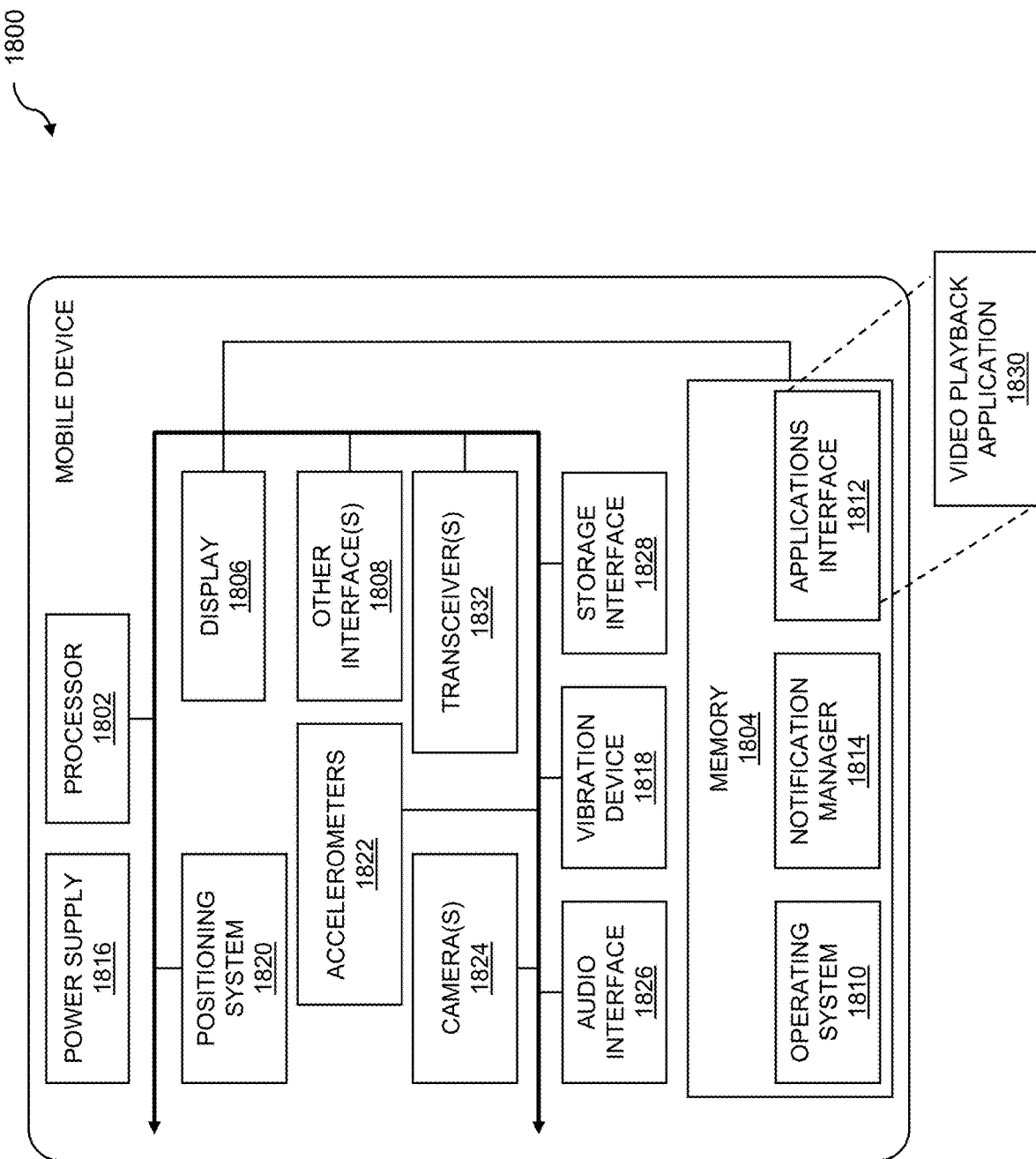
FIG. 18 illustrates an example mobile device.

FIG. 18 illustrates an example mobile device. The mobile device 1800 may be used to implement an audio and video stream rendering modification based on device rotation metric. The mobile device 1800 includes a processor 1802, a memory 1804, a display 1806 (e.g., a touchscreen display), and other interfaces 1808 (e.g., a keyboard). The memory 1804 generally includes both volatile memory (e.g., RAM) and non-volatile memory (e.g., flash memory). An operating system 1810, such as the Microsoft Windows® Phone operating system, resides in the memory 1804 and is executed by the processor 1802, although it should be understood that other operating systems may be employed.

One or more application programs modules 1812 are loaded in the memory 1804 and executed on the operating system 1810 by the processor 1802. Examples of applications 1812 include, without limitation, email programs, scheduling programs, personal information managers, Internet browsing programs, multimedia player applications, etc. In one implementation, audio and video stream rendering modification based on a device rotation metric video stream playback application 1830 may be implemented on the application programs module 1812. A notification manager 1814 is also loaded in the memory 1804 and is executed by the processor 1802 to present notifications to the user. For example, when a promotion can be triggered and presented to a shopper, the notification manager 1814 can cause the mobile device 1800 to beep or vibrate (via the vibration device 1818) and display the promotion on the display 1806.

The mobile device 1800 includes a power supply 1816, which is powered by one or more batteries or other power sources and which provides power to other components of the mobile device 1800. The power supply 1816 may also be connected to an external power source that overrides or recharges the built-in batteries or other power sources.

The mobile device 1800 includes one or more communication transceivers 1832 to provide network connectivity (e.g., mobile phone network, Wi-Fi®, Bluetooth®, etc.). The mobile device 1800 also includes various other components, such as a positioning system 1820 (e.g., a global positioning satellite transceiver), one or more accelerometers 1822, one or more cameras 1824, an audio interface 1826 (e.g., a microphone, an audio amplifier and speaker and/or audio jack), and additional storage 1828. Other configurations may also be employed.

In an example implementation, a mobile operating system, various applications, and other modules and services may be embodied by instructions stored in memory 1804 and/or storage devices 1828 and processed by the processing unit 1802. User preferences, service options, and other data may be stored in memory 1804 and/or storage devices 1828 as persistent datastores.

Figure 19:
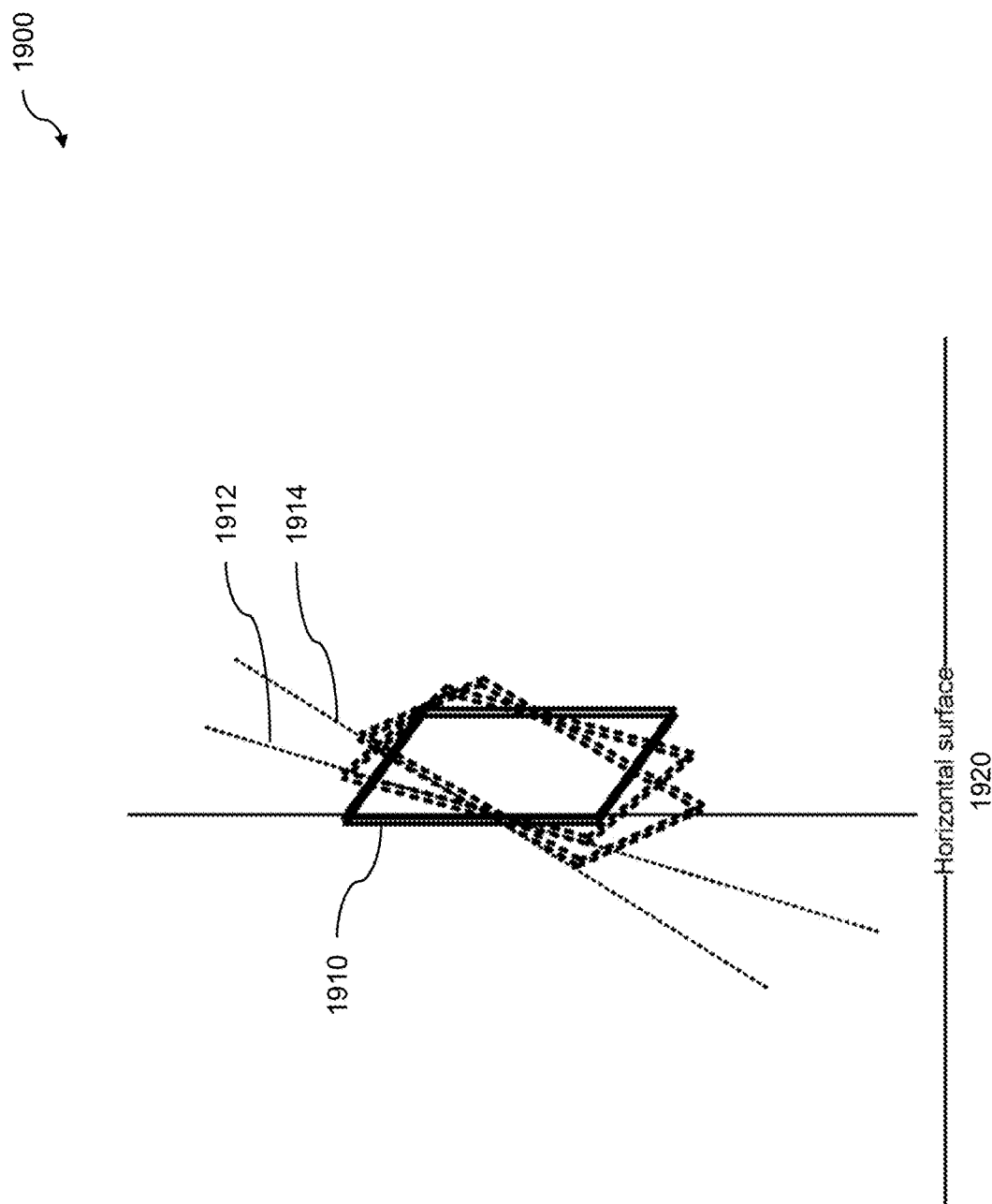
FIG. 19 illustrates an example move of a display device.

FIG. 19 illustrates an example move 1900 of a display device. A display device, such as a display coupled to a personal electronic device including a smartphone, tablet, or PDA, etc., can be used by an individual to display a video. The video that is displayed can include a movie, a video game, etc. The display can be rotated as the individual views the video. Rotation of the display is used for an audio and video stream rendering modification based on a device rotation metric. A display 1910 can be in an initial orientation such as vertical with respect to a horizontal surface 1920. As the individual views video, the user can rotate the display to varying amounts of rotation. Two rotations are shown, a first rotation 1912 and a second rotation 1914. The rotation of the display can enable the individual to view extended portions of the video, such as extended portions up, down, left, right, etc. The display can also be rotated within a plane. The rotation within a plane can include a clockwise rotation, a counterclockwise rotation, etc. The rotation within a plane can further enhance the immersive video experience by changing a viewport into the video.

Figure 20:
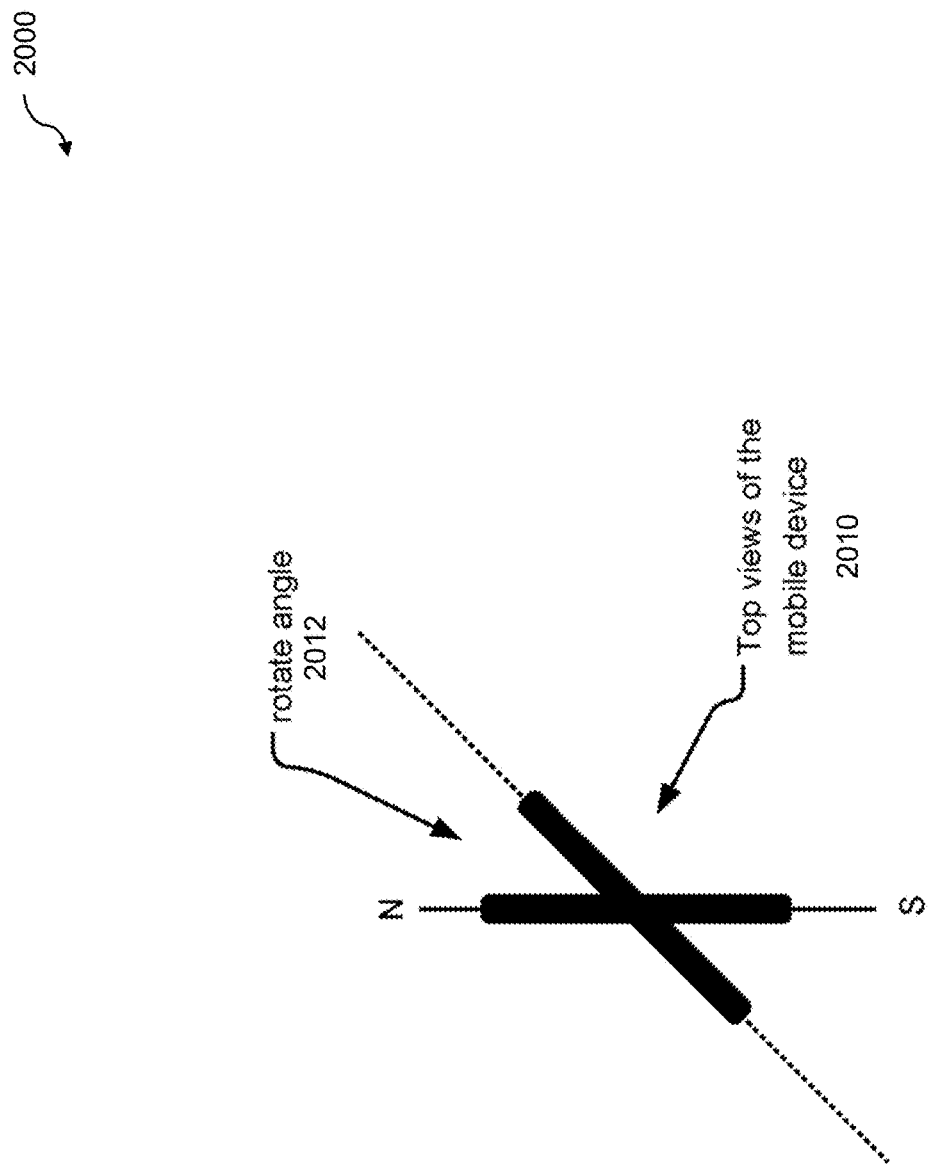
FIG. 20 illustrates an example rotation of a display device.

FIG. 20 illustrates an example rotation 2000 of a display device. Discussed throughout, an individual can view a movie, TV program, video game, or other video content using a display coupled to an electronic device such as a smartphone, tablet, game console, laptop computer, etc. As the individual views the video, that individual can rotate the display. The rotation of the display can change a viewport provided to the individual into the video. Rotation of the display device enhances an audio and video stream rendering modification based on a device rotation metric. An electronic device 2010 can be viewed from the top. While rotation of the electronic device has been described above for forward and back rotation (pitch) and rotation within a plane (roll), the device can further be rotated with respect to the top view of the device (yaw), as illustrated by rotate angle 2012. This latter rotation can enable different viewing angles and can further enable in-video actions such as looking left or looking right. Such viewing of the video can include viewing extended portions of the video. The extended portions of the video can be filled with generated video data, where the generated video data can be generated using techniques including image processing techniques, machine learning techniques, and the like.

Figure 21:
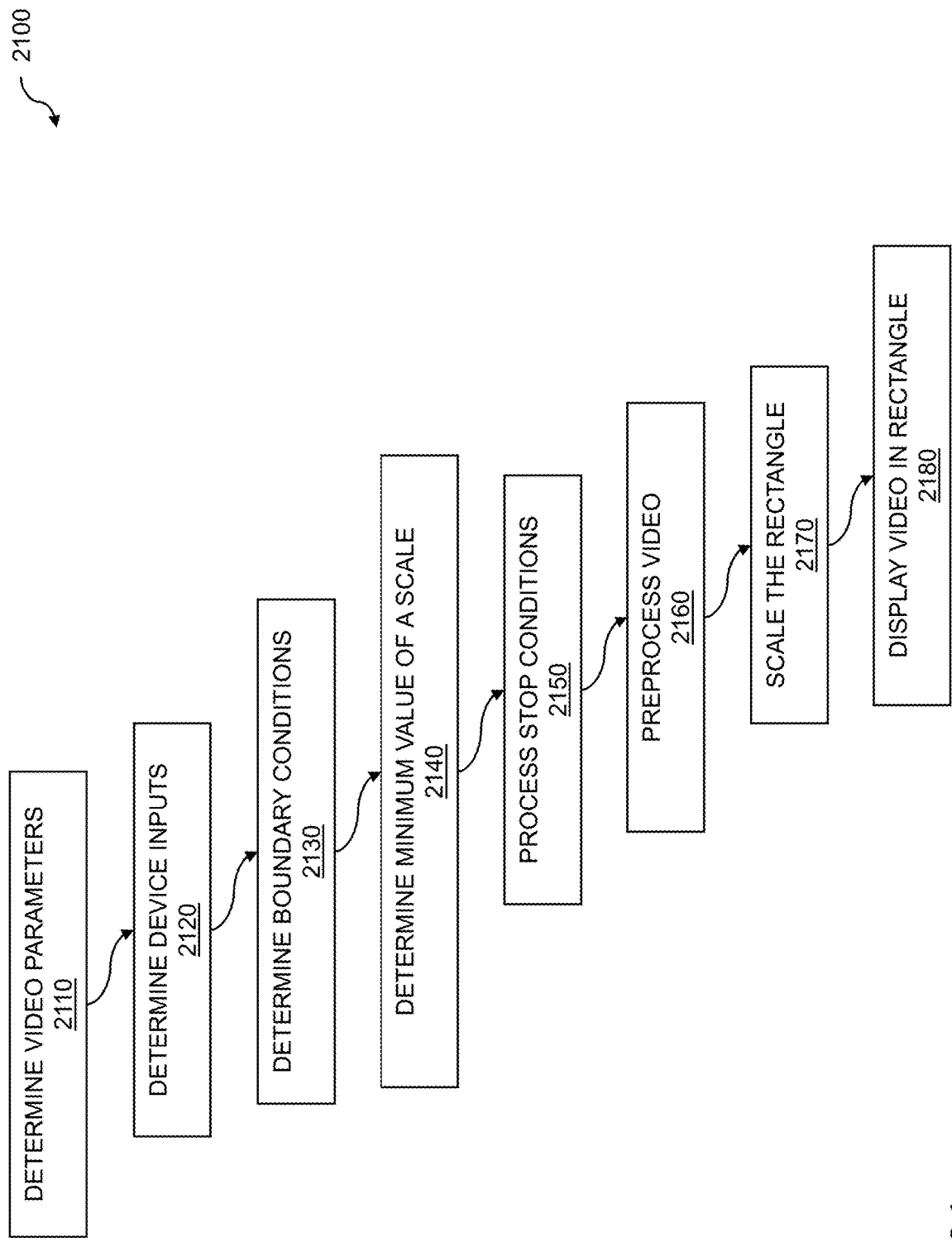
FIG. 21 illustrates example operations of a system for providing an audio and video stream rendering modification based on a device rotation metric.

FIG. 21 illustrates example operations of a system 2100 for providing an audio and video stream rendering modification based on a device rotation metric. An operation 2110 determines various parameters of a video, including a size of the video, a size of a viewport used to display the video, an angle of the viewport, a scale factor, etc. An operation 2120 determines various device inputs, such as an input from an accelerometer, an input from a gyroscope, etc. An operation 2130 determines one or more boundary conditions, such as viewport of the user, a zoom factor, etc. An operation 2140 determines a minimum value of a scale to inscribe a rectangle in an oval. An operation 2150 processes one or more stop conditions disclosed herein. For example, one stop condition may be that if the device displaying the video is put on a substantially horizontal surface as indicated by a device input, the processing of the video as disclosed herein is stopped.

An operation 2160 preprocesses the video according to one or more preprocessing methods disclosed herein. An example preprocessor may be processing the video using a low-pass filter. Another preprocessing operation may include one of a video inset and/or a viewport inset before a core algorithm disclosed herein is applied. An operation 2170 smooths the scale of the rectangle according to one or more scaling methods disclosed herein. An operation 2180 may display the video in the rectangle.

Figure 22A:
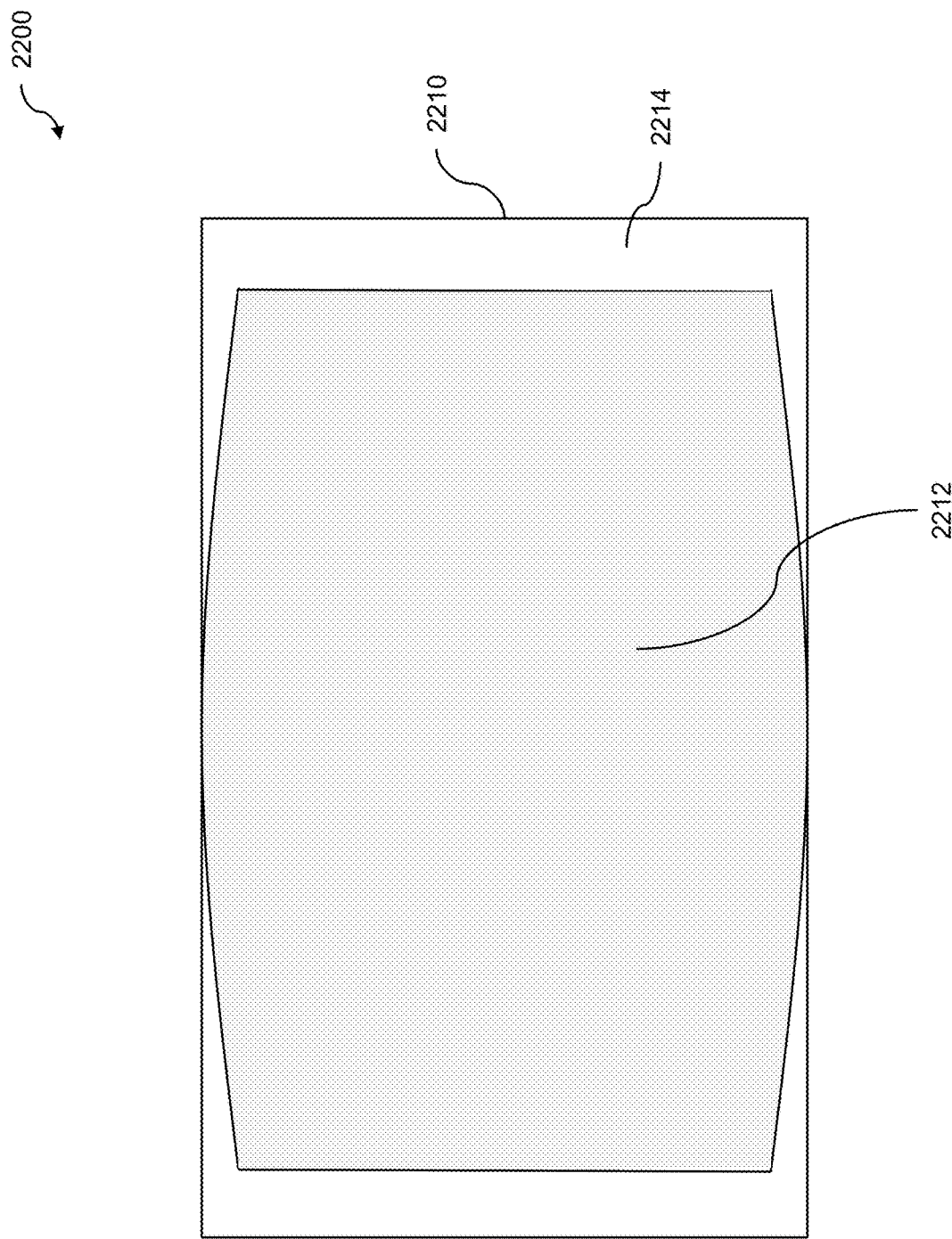
FIG. 22A illustrates an initial video on a device viewport.

FIG. 22A illustrates an initial video on a device viewport. An implementation of the system is disclosed wherein, as the viewport of a device is rotated, the video shown in the viewport is expanded in order to maximize the visible area of original video. In other words, the system proposes a technique for reducing invisible areas of the video while performing rotation of the viewport. Specifically, as shown at 2200, the original video 2210 is shown and the visible area 2212 on a viewport is also shown. Since 2212 is smaller than the original video in 2210, only part of the video is shown on the viewport, thus resulting in lost regions 2214 of the video that would not be seen on the viewport at any rotate angle.

Figure 22B:
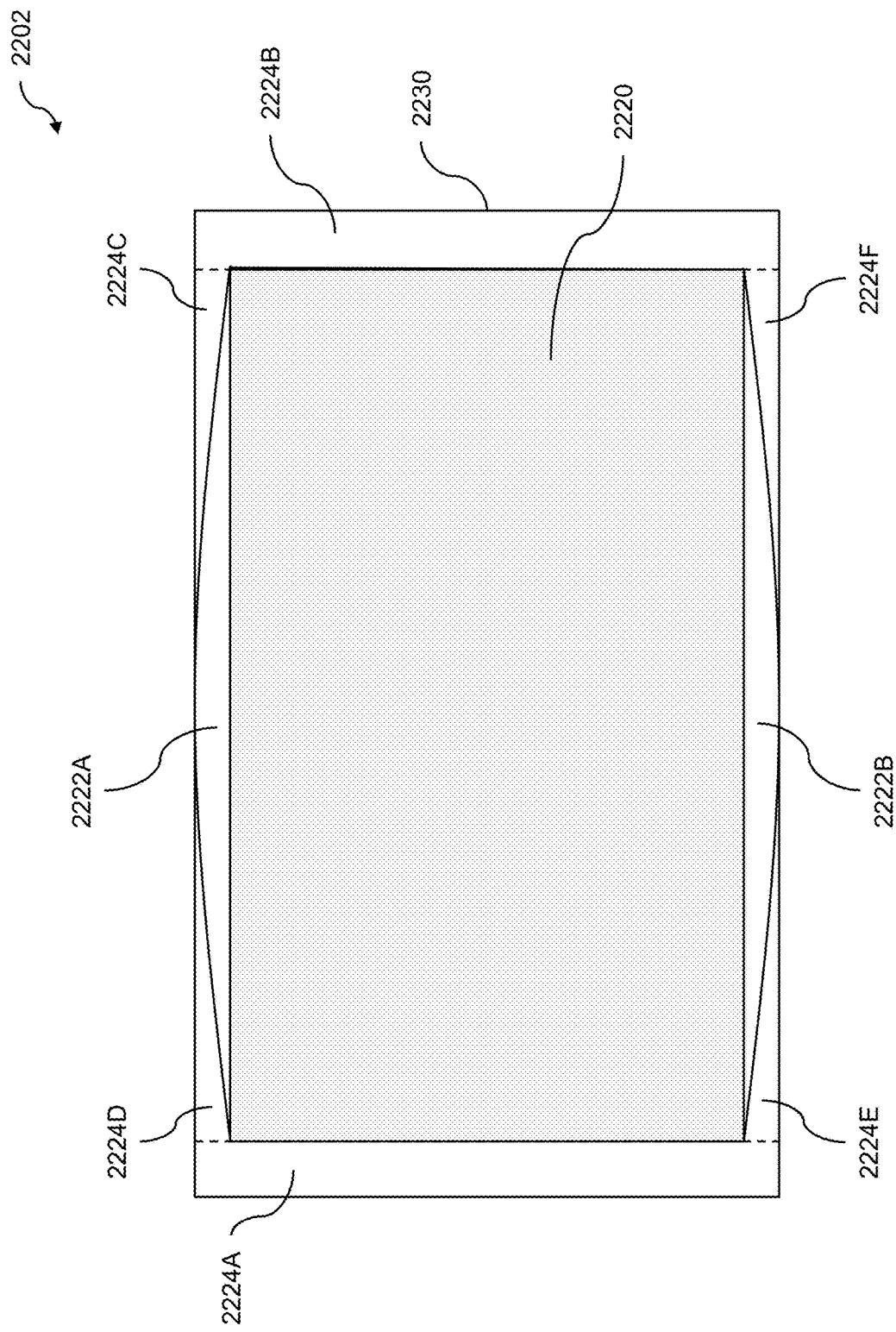
FIG. 22B illustrates an expanded video as device viewport is rotated.

FIG. 22B illustrates an expanded video as the device viewport is rotated. On the other hand, in the proposed system, as shown in 2202, the original video is 2220 and the visible area on a viewport is 2230. The visible area 2230 fully contains the original video of 2220, which indicates no loss of video content in visible regions. The video is expanded to fill in the extended regions 2224 (as illustrated by 2224A and 2224B to the sides and 2224C, 2224D, 2224E, and 2224F to the top and bottom). Furthermore, 2222A on the top and 2222B on the bottom illustrate additional portions of video that are captured on the viewport (while they would be lost in the illustration 2200). In one implementation, the extended regions 2224 may be filled with video image that is generated by image processing and/or machine learning techniques to fill in the peripheral regions of the viewport 2230 beyond the size of the original video is 2220. For example, the content of the extended regions 2224 may be generated so as to show seamless extension of the video from size 2220 to viewport visible area 2230.

The video extrapolation or extend technology disclosed in FIGS. 22A and 22B allows users to view video on the viewport without any side or top edges as the viewport is tilted to the clockwise or counterclockwise direction compared to a vertical axis of the viewport.

Figure 23A:
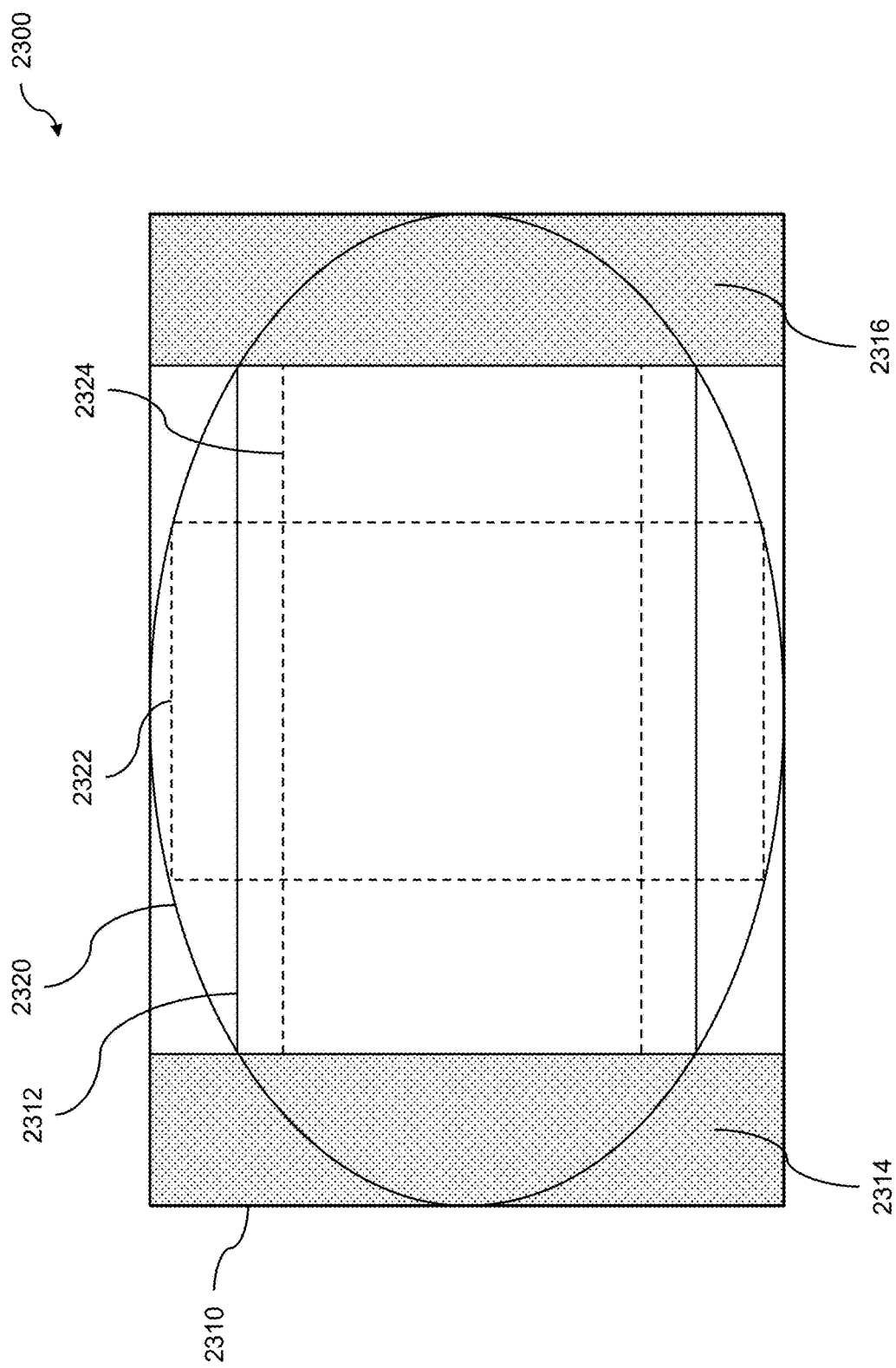
FIG. 23A shows a display with abandoned video portions.

FIG. 23A shows a display with abandoned video portions. Discussed throughout, a video, such as a movie, TV series, educational program, political message, etc., can be rendered on a display. In embodiments, portions of the video can be abandoned, where the abandonment can be based on parameters associated with the video and further parameters associated with a display. The abandoning of portions of the video can enable an enhanced or improved viewing of the video on the display due to differences between video and display capabilities, sizes, resolutions, and the like. Abandoning video portions can enable audio and video stream rendering modification based on a device rotation metric. A plurality of parameters pertaining to a video and a second plurality of parameters pertaining to a video display on a device are obtained. A minimum scale value is calculated to inscribe a rectangle within an oval based on a height and a width of the video, wherein a height and a width of the video display define the rectangle. A rectangular portion of the video is rendered on the video display, wherein the rectangular portion is on or inside boundaries of the oval.

Display of a video with abandoned video portions is shown 2300. The video 2310, can include a wide variety of video material, as described above and throughout. The video parameters associated with the video can include an aspect ratio, a resolution, a frame rate, a refresh rate, a color temperature, and the like. The minimum scale that can be calculated can be used to scale the video, resulting in a video rectangle 2312 that can fit within an oval 2320. Since the rectangle 2312 is smaller (in this example) than the original video, then portions of the video such as video portion 2314 and video portion 2316 can be abandoned. In embodiments, the abandonment of the video portions can be accomplished using wide-side trimming of the video. The scaled video can be viewed on an electronic device such as a laptop computer, a smartphone or PDA, a tablet, and the like. Further embodiments can include preprocessing the video using at least one of a video inset and a viewport inset. In this example, two viewports are shown: a viewport with zero degrees of rotation 2322, and a viewport with ninety degrees of rotation 2324. The viewport 2322 can show the video in a vertical or portrait format, and the viewport 2324 can show the video in a horizontal or landscape format.

Figure 23B:
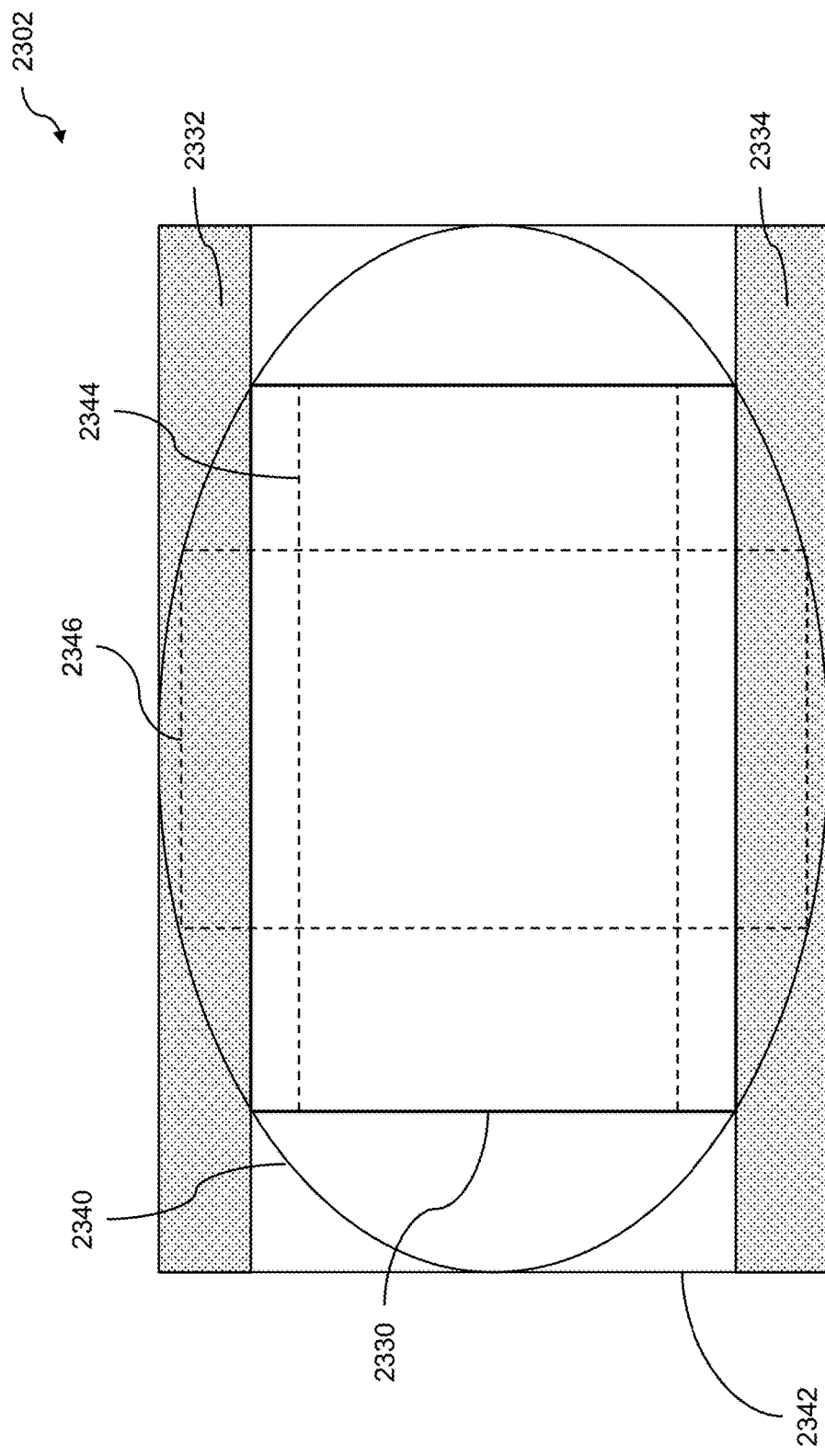
FIG. 23B shows a display with extended video portions.

FIG. 23B shows a display with extended video portions 2302. The video 2330 can be scaled and can be rendered on or inside the boundaries of an oval 2340. The rendering of the video can include displaying the video on a display associated with an electronic device such as a smartphone or tablet, a computing device such as a laptop computer, etc. The oval can have dimensions that enable the oval to fit within a rectangle 2342, where the rectangle can be defined by the width and the height of the device viewing area. The video can be scaled by a factor of one (e.g. unscaled or unaltered) or by another factor. The scaling can be applied to the height of the video and to the width of the video. In embodiments, the scaled value of the height and the scaled value of the width provide expansion of the video. The expansion of the video can include zooming into the video. In embodiments, the expansion of the video maximizes a visible area of the video within the video display. Discussed throughout, the video can be preprocessed using at least one of a video inset and a viewport inset. In the example, two viewports are shown: a horizontal or ninety-degree rotated viewport 2344, and a vertical or zero-degree rotated viewport 2346. Note that the vertical viewport extends above and below the boundaries of the video 2330. Embodiments include filling extended portions of the video with video image data. The extended portions of the video can include extended portion 2332 and extended portion 2334. The extended portions can be filled in using a variety of techniques. In an embodiment, the filling can be accomplished by generating the video image data by image processing. The video data can be generated using techniques including interpolation, extrapolation, and so on. In other embodiments, the filling can be accomplished by generating the video image data by machine learning. The machine learning can be used to analyze a scene and to predict what video image data can be included within extended portion or portions.

Figure 23C:
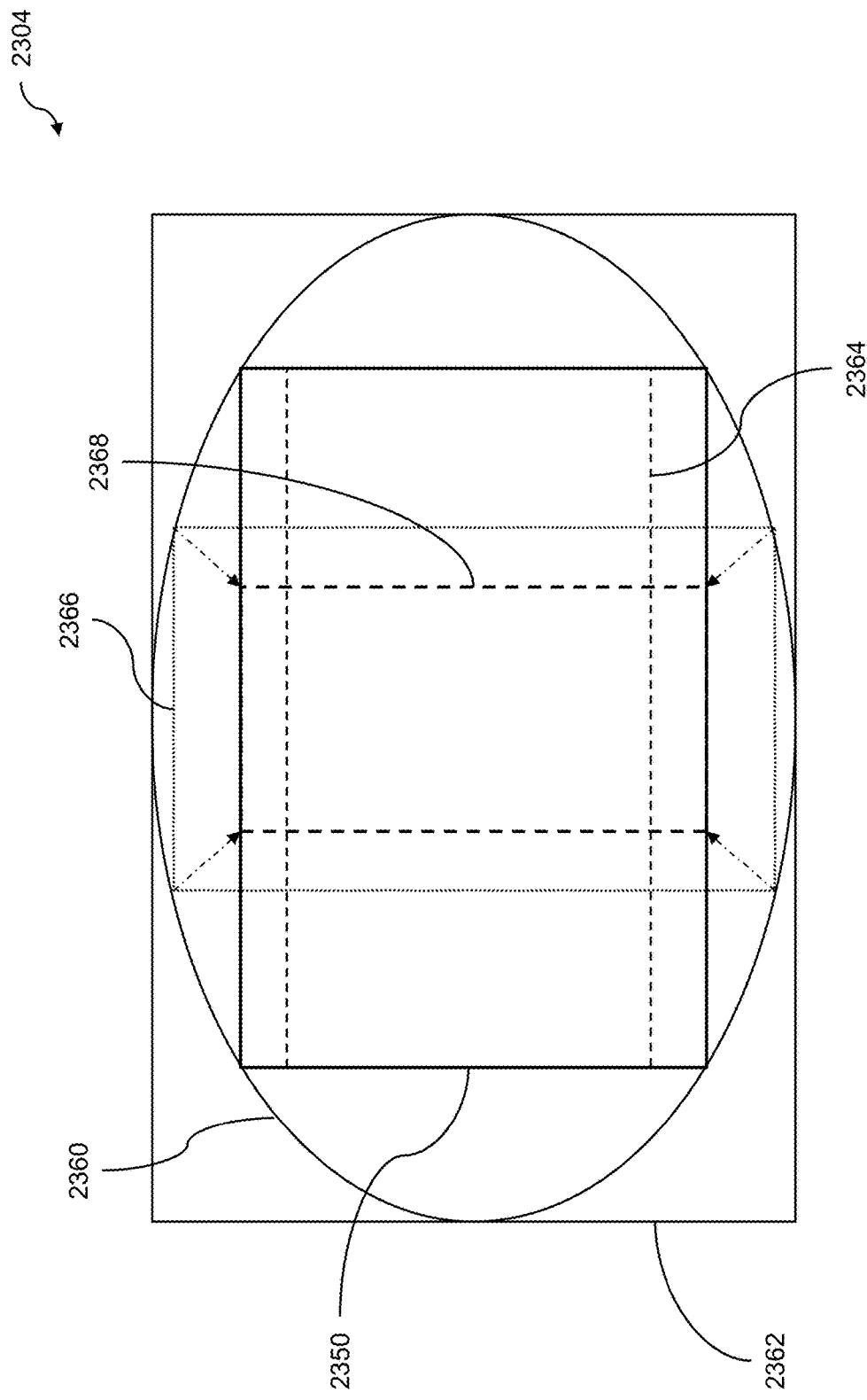
FIG. 23C shows a display with original video.

FIG. 23C shows a display with original video. The original video can be displayed within a viewport. The video can be scaled such that the viewport enables viewing of the original video region without abandoning video data, trimming video data, or filling in video data. A display with original data 2304 supports audio and video stream rendering modification based on a device rotation metric. Discussed above and throughout, the video 2350 can be rendered on or inside the boundaries of an oval 2360, where the rendering of the video includes displaying the video on a personal electronic device, a computing device, and so on. The oval has height and width dimensions that enable the oval to fit within a rectangle 2362. The video can be scaled to fit within the oval or can be left unscaled. The scaling can expand the video to fit within the oval, where the expansion of the video can maximize the visible area of the video. As discussed previously, the video can be preprocessed using at least one of a video inset and a viewport inset. Two viewports are shown, including a horizontal, landscape, or ninety-degree rotated viewport 2364; and a vertical, portrait, or zero-degree rotated viewport 2366. Note that the vertical viewport extends above and below the boundaries of the video 2350. The viewport can be scaled such that the viewport includes the original video region 2368. By scaling the vertical viewport, the original video region can be used without requiring the extended portions of the video to be filled in or trimmed.

Figure 24:
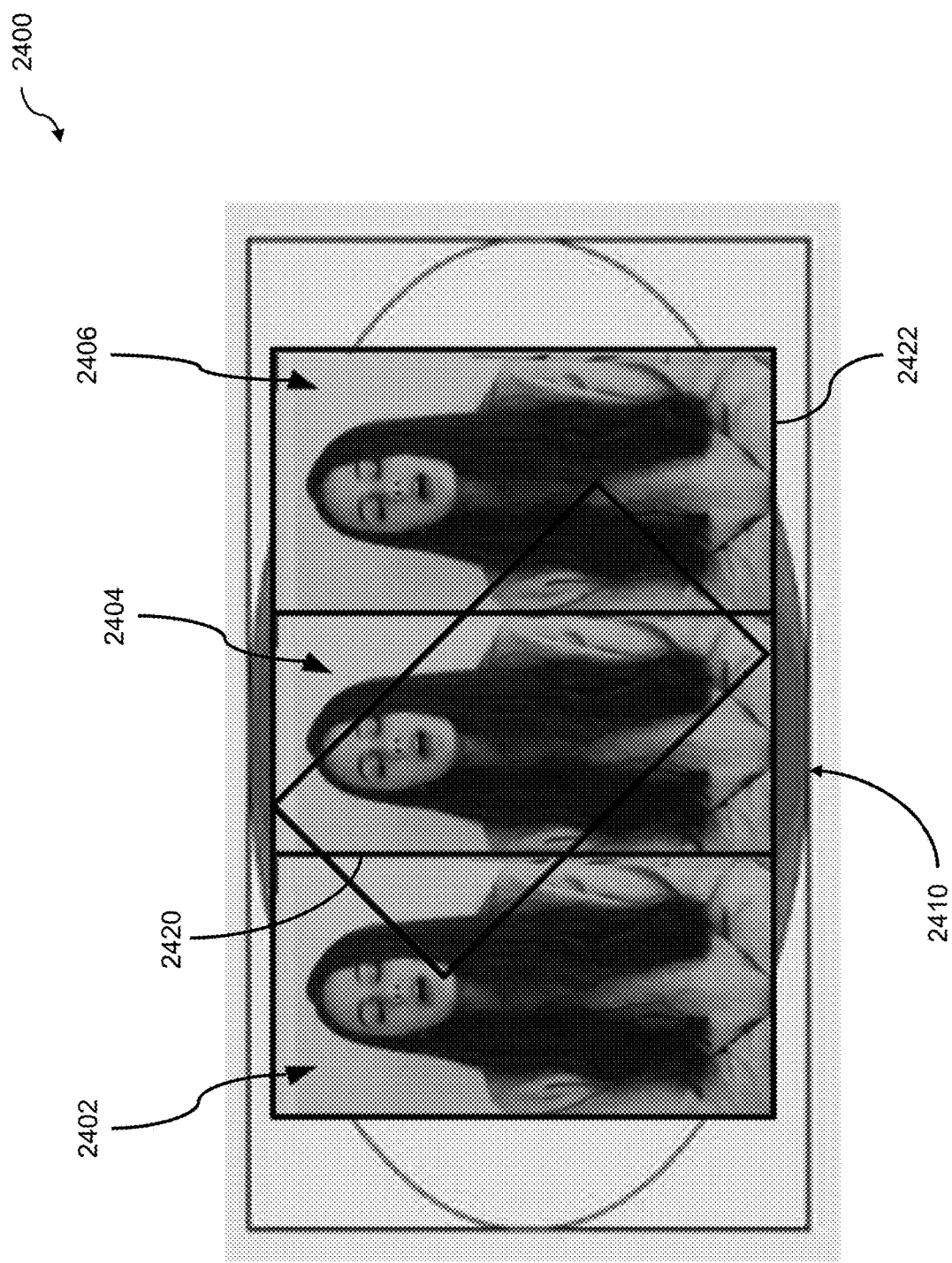
FIG. 24 illustrates playing back media streams.

FIG. 24 illustrates playing back media streams. One or more media streams can be displayed on a handheld device. As the handheld device is rotated, more or fewer media streams can be displayed. The media streams can include video streams, audio streams, and so on. The revealing or hiding of media streams based on an orientation of the handheld device enables audio and video stream rendering modification based on a device rotation metric. One or more media streams are received from a server, wherein the one or more media streams are targeted for display on a handheld media stream playback device. An orientation of the handheld device is determined during playback of at least one of the one or more media streams on the handheld device. A change in the orientation of the handheld device is detected, wherein the change occurs during playback of the at least one of the one or more media streams. A rotation angle of the handheld device is calculated, based on the detecting. The playback of at least one of the one or more media streams is changed on the handheld device, based on the rotation angle.

Media streams can be played back on a handheld device 2400. One or more media streams, such as media streams 2402, 2404, and 2406, can be played back on the handheld device. The media streams can be assigned to spatial locations within a video masking region 2410. The video masking region can be determined by physical dimensions of the handheld device, a server, a playback engine associated with the handheld device, and so on. The portions of the one or more media streams that can be played back on the handheld device can depend on the orientation of the handheld device. The media streams 2402, 2404, and 2406 can include the same media stream, portions of the same media stream, associated media streams, user-selected media streams, and the like. When the handheld device is in a substantially vertical orientation 2420, fewer media streams may be played back. In a usage example, when the handheld device is in a substantially vertical orientation, only media stream 2404 is played back on the device. When the handheld device is rotated to a substantially horizontal orientation, then more than one media stream may be played back. In a usage example, when the handheld device is in a substantially horizontal orientation, then media streams 2402, 2404, and 2406 can be played back on the handheld device.

In other words, as the viewport of device 2400 is rotated, additional streams of video and/or audio are shown through the viewport and the device. Specifically, a device may use more than one audiovisual streams 2402, 2404, 2406 and assign them to spatial locations in a video masking region 2410. Specifically, based on the parameters of the device, such as its angle, etc., additional parts of the audiovisual streams 2402, 2404, 2406 may be shown on the viewport. For example, when the viewport is in an upright position 2420, only the audiovisual stream 2404 is shown. However, when the viewport in the horizontal position 2422, all of the audiovisual streams 2402, 2404, and 2406 are shown to the viewer. This can also enable a sound reveal, based on the orientation of the device 2400, such that different audio streams can be included. The sound reveal can also include additional audio streams being included in a certain orientation.

Figure 25:
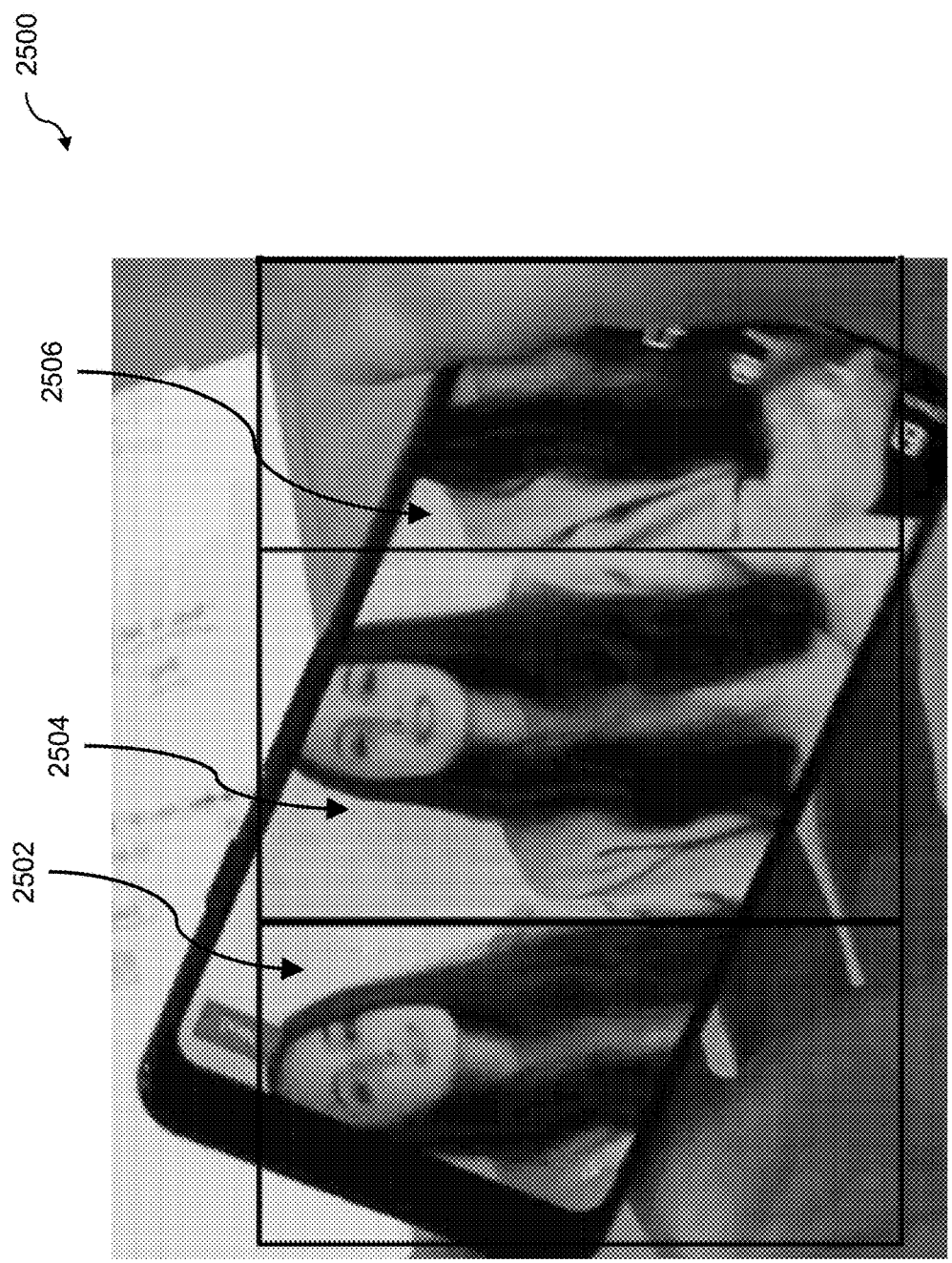
FIG. 25 shows an intermediate viewport angle.

FIG. 25 shows an intermediate viewport angle 2500. A handheld device can be oriented in a substantially horizontal orientation or a substantially vertical orientation, or can be oriented at an angle between horizontal (0 degrees) and vertical (90 degrees). Playback of an original media stream on a handheld device that is substantially vertical, or of combined media streams on a handheld device that is substantially horizontal can include one or more video streams, one or more audio streams, captions, and so on. If the handheld device is orientated at an angle between horizontal and vertical then the media streams, captions, etc., can be selectively played back on the handheld device. The selected content can be based on a framework. Media stream playback based on an intermediate viewport angle enables audio and video stream rendering modification based on a device rotation metric. The framework can include a combination of one or more media streams, including video streams, audio streams, additional information, and so on. The framework can include an original media stream 2504, where the media stream can be rotated. The framework can include another media stream 2502, where the media stream 2502 is a frame from the original media stream 2504, a different portion of the media stream, and so on. The framework can further include an additional media stream 2506. The additional media stream can be covered, filled, exposed, etc. In embodiments, the filling can cover peripheral regions of a video display beyond content contained in the at least one of the one or more media streams.

The combination of media streams and additional information can be based on the rotation angle of the handheld device. The media streams and additional information that can be included in the framework can include rotated versions of media streams such as video streams; included or muted audio streams; included or omitted lyrics, translations, or comments; etc. The content of the framework can include a voiceover audio stream, augmented audio streams that can be included based on handheld device rotation, etc. In embodiments, the calculating the rotation angle can be based on one or more motion sensors included in the handheld device. The framework can also include voice change or morphed audio streams. The rotation of the device to an intermediate angle between horizontal and vertical can include alternative audio streams, where the alternative audio streams might include a different vocalist, lyrics in a different language, a commentary about the media stream, and the like. In other embodiments, the rotation of the handheld device can affect diminishing audio streams, audio stream fades, and the like. Based on the direction of rotation of the handheld device, other portions of a media stream can be exposed. In embodiments, the peripheral regions can be exposed, based on the rotation angle.

Thus, intermediate viewport angle 2500 shows the viewport at an angle in between being vertical or horizontal. As shown in this case, part of the audiovisual streams 2502, 2504, and 2506 are shown on the viewport based on their spatial allocation to the viewport. Note that while in the illustrated implementations of FIGS. 24 and 25, the same player is part of all three streams; in alternative implementations, different players may be part of different streams.

The proposed system creates a framework that the viewport delivers a combination of multiple audiovisual streams based on the rotate angle of the viewport. The possible implementation includes, but is not limited to, (a) voiceover, or augmented audio streams, in which additional audio streams are added only when the user rotates the viewing device; (b) voice change, or morphed audio streams, which as the user rotates the device, enables the audible streams to change from one or multiple streams to alternative streams; (c) voice off, or diminishing audio streams, in which a part of the audio stream fades out as the user rotates the device.

Figure 26:
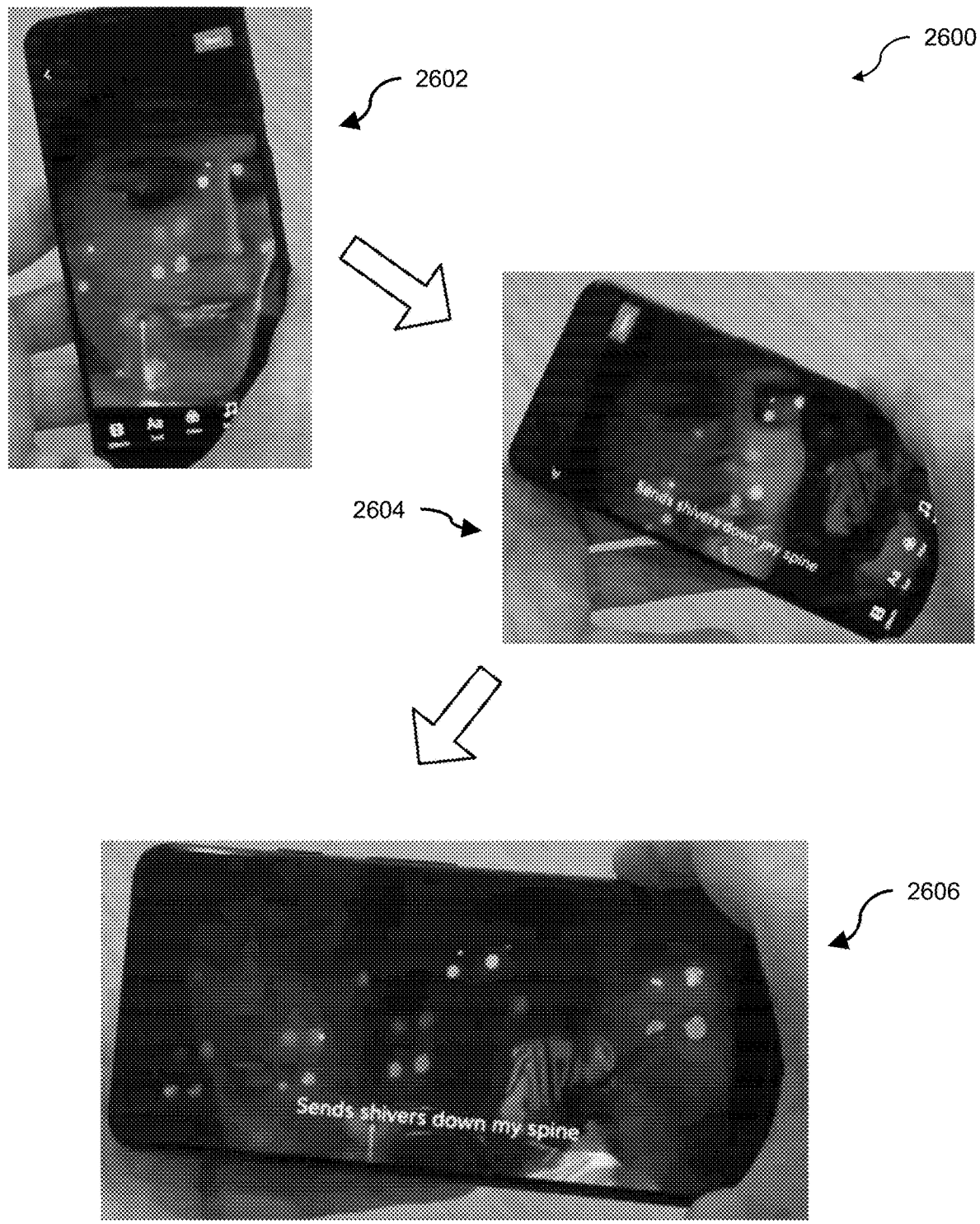
FIG. 26 illustrates displaying additional information with media streams.

FIG. 26 illustrates displaying additional information with media streams. Discussed throughout, one or more media streams can be played back on a handheld device such as a smartphone, tablet, PDA, a purpose-built media player, and so on. As a user is engaging with one or more media streams, the user can rotate a handheld device on which the one or more media streams are being played back. The media streams can be viewed through a viewport, where the viewport can enable viewing of a portion of the media stream. The viewport can cover portions of the media stream, extend viewable portions of the media stream, and so on. As the handheld device is rotated by the user, the viewport angle rotates. The media streams being played back can be combined or removed, depending on the orientation of the handheld device. In some orientations of the viewport, additional information can be displayed along with the one or more media streams. Displaying additional information supports audio and video stream rendering modification based on a device rotation metric.

Additional information 2600 can be displayed for media stream playback. With a handheld device oriented vertically, a viewport 2602 can also be oriented in a substantially vertical or upright orientation. Orienting the handheld device in this position can be used to limit playback of one or more media streams to audio and video playback only. The device can be rotated clockwise or counterclockwise from the substantially vertical orientation to another orientation such as a substantially horizontal orientation 2604. As a result of the rotation, additional information can be displayed along with the playback of the one or more media streams. The additional information can be displayed as captions rendered over the one or more media streams. A caption can be obtained that can be related to the one or more media streams. In embodiments, the caption can be displayed when the handheld device is substantially horizontal. In a usage example, rotation from a vertical to a horizontal orientation of the handheld device being used to playback a music video can include song lyrics within captions. In further embodiments, changing the playback, the caption, and the one or more media streams can be based on the rotation angle. If the handheld device is rotated again, the playback can be further changed. In embodiments, the caption can be removed when the handheld device is substantially vertical. A value, flag, and so on, can be used to determine whether a caption will be shown. In a usage example, suppose a vertical position of a viewport is assigned a value of 0 and horizontal position of the viewport is assigned a value of 1. As the viewport angle is rotated and the value assigned changes from 0 to 1, the opacity of lyrics can change from 1 (totally transparent) to 0 (clear white or visible). Other aspects of the media stream can also be altered. The alterations to the media stream of a music video can include adjusting volume of a vocal track, one or more instrument tracks, and the like. That is, vocals, instruments, lyrics, and so on, can be faded in or out of a media stream as the handheld device is rotated.

As such, FIG. 26 illustrates a special implementation of the system disclosed in FIGS. 24-25, wherein as the viewport angle is rotated, additional information about the audiovisual stream being displayed can be added to the viewport. For example, when the viewport is in an upright position 2602 (or a substantially upright position as perceived by the user), only the audiovisual stream is displayed. However, as the viewport is rotated to the counter-clockwise direction to 2604 and 2606, captions of the lyrics of the audiovisual stream are added to the viewport. The lyric captions may be faded in or out as the rotation angle changes. Thus, for example, suppose the vertical position of the viewport is assigned a value of 0 and horizontal position of the viewport is assigned a value of 1. As the viewport angle is rotated and the value assigned changes from 0 to 1, the opacity of lyrics changes from 1 to 0 (from totally transparent, hence not visible, to bright white). At the same time, the vocal track volume changes from 1 to 0, so the music becomes a music accompaniment in a karaoke style. In this manner, the rendering is a dynamic combination of audio streams that can include adding audio streams as well as subtracting audio streams. In other embodiments, the audio streams can provide audio in different languages, and a language can be changed based on the orientation of the device or a change in the orientation of the device.

Figure 27:
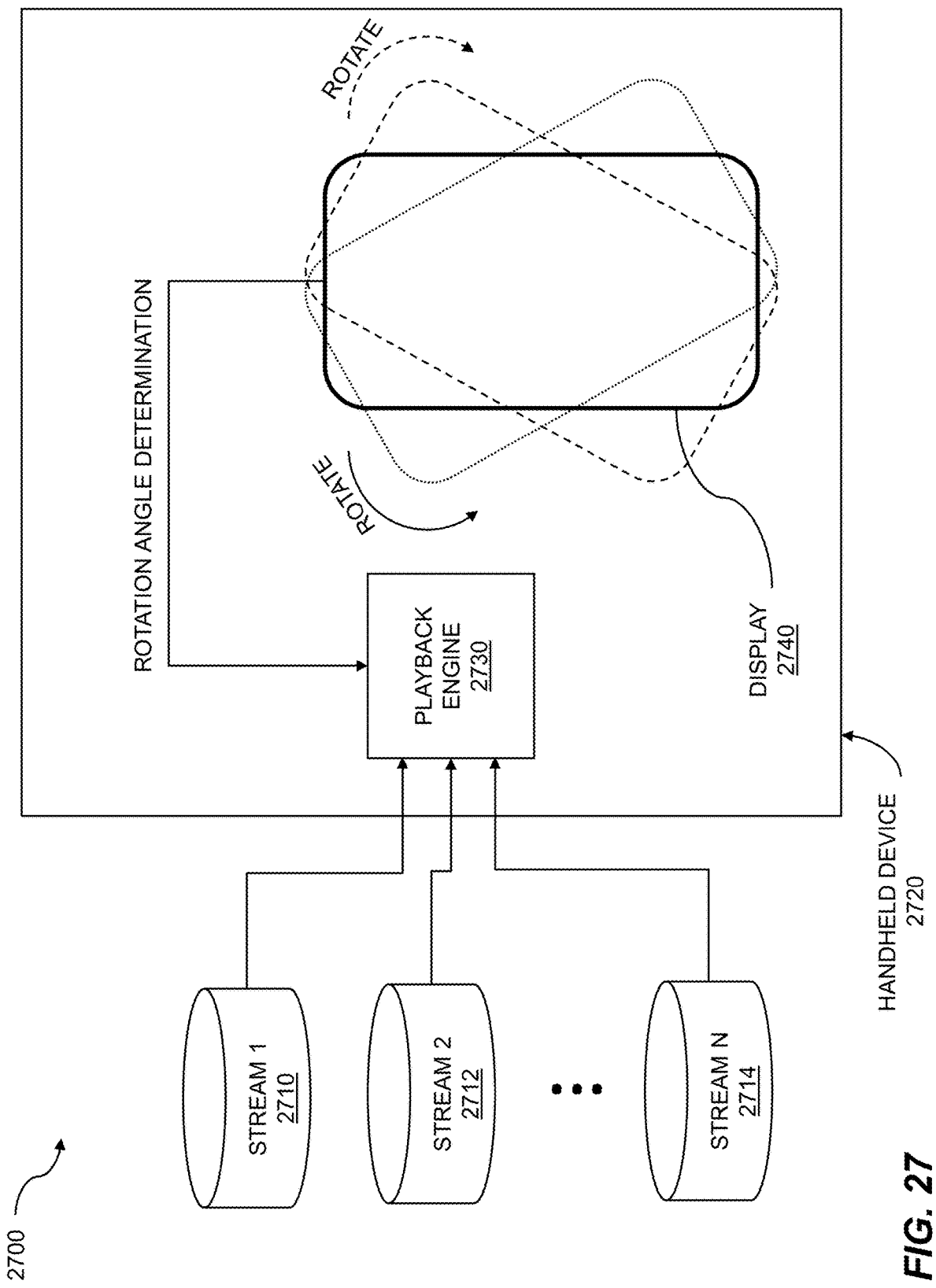
FIG. 27 shows a block diagram for media stream playback.

FIG. 27 shows a block diagram for media stream playback 2700. The media stream playback can include one or more audio streams, one or more video streams, and so on. The one or more media streams can be displayed on a handheld device. The handheld device can be rotated by a user, and the rotation can control how the playback of the one or more media streams occurs. Media stream playback is enabled by audio and video stream rendering modification based on a device rotation metric. One or more media streams are received from a server, wherein the one or more media streams are targeted for display on a handheld media stream playback device. An orientation of the handheld device is determined during playback of at least one of the one or more media streams on the handheld device. A change in the orientation of the handheld device is detected, wherein the change occurs during playback of the at least one of the one or more media streams. A rotation angle of the handheld device is calculated, based on the detecting. The playback of at least one of the one or more media streams is changed on the handheld device, based on the rotation angle.

One or more video streams, such as stream 1 2710, stream 2 2712, stream N 2714, and so on, can be stored on a server (not shown). The server can include local server, a remote server, a cloud server, a distributed server, and so on. The server can store media streams, where the media streams can include video streams, audio streams, and so on. The video streams can include videos, short-form videos, and the like. The audio streams can include single channel audio (mono), multichannel audio (stereo, 5.1, Atmos™), and the like. The media streams that can be stored on the server can be uploaded by a user, downloaded over a computer network such as the Internet, etc. The media streams can be played back on a handheld device 2720. The handheld device can include a smartphone, a tablet, a personal digital assistant (PDA), a dedicated media stream playback device, and so on.

The handheld device can include a playback engine 2730. The playback engine can include electronic hardware coupled to the handheld device, a program, code, or app loaded onto and executing on the handheld device, etc. The playback engine can receive one or more video streams from the server. The playback engine can target the one or more media streams for display on the handheld device. The handheld device can include a display 2740. The display can include an LCD display, an LED display, and so on. The display can include a touch screen display, where the touch screen display can respond to an amount of pressure exerted by a user of the handheld device. The display can be rotated by the user. The rotation of the display can include rotating the display clockwise or counterclockwise, tipping the screen away from or toward the user, etc. The rotation of the display can include changing orientation of the display from a vertical orientation to a horizontal orientation; from a horizontal orientation to a vertical orientation; or to an angle corresponding to an orientation between horizontal and vertical. The orientation of the display associated with the handheld device can be determined by detecting a change in orientation of the handheld device.

The determined rotation angle can be provided to the playback engine. The playback engine can change the playback of the one or more media streams on the handheld device based on the rotation angle. The rotation angle can be used by the playback engine to combine media streams or to "de-combine" media streams. The rotation angle can be used to speed up, slow down, pause, start, etc., the media streams. In embodiments, the rotation angle can be used to generate a rotation metric. The rotation metric can impact zoom calculations and renderings for a multiple media stream view playback on the handheld device. Recall that captions can be displayed with the media streams. Embodiments include changing the playback, the caption, and the one or more media streams, based on the rotation angle. The rotation angle can be used to further control the playback of the one or more media streams on the handheld device. The rotation angle can be used to cover peripheral regions of a video display beyond content contained in the at least one of the one or more media streams. The covering peripheral regions can include displaying a frame, a mask, and so on with the one or more media streams. Other embodiments include filling extended portions of the at least one of the one or more media streams with video image data. In a usage example, a user could rotate her handheld device to the right, left, up, or down to "see" to the right, left, up, or down in the media stream. The filling extended portions of a media stream can be accomplished with video image data. In other embodiments, the filling can be accomplished by generating the video image data by image processing.

Figure 28:
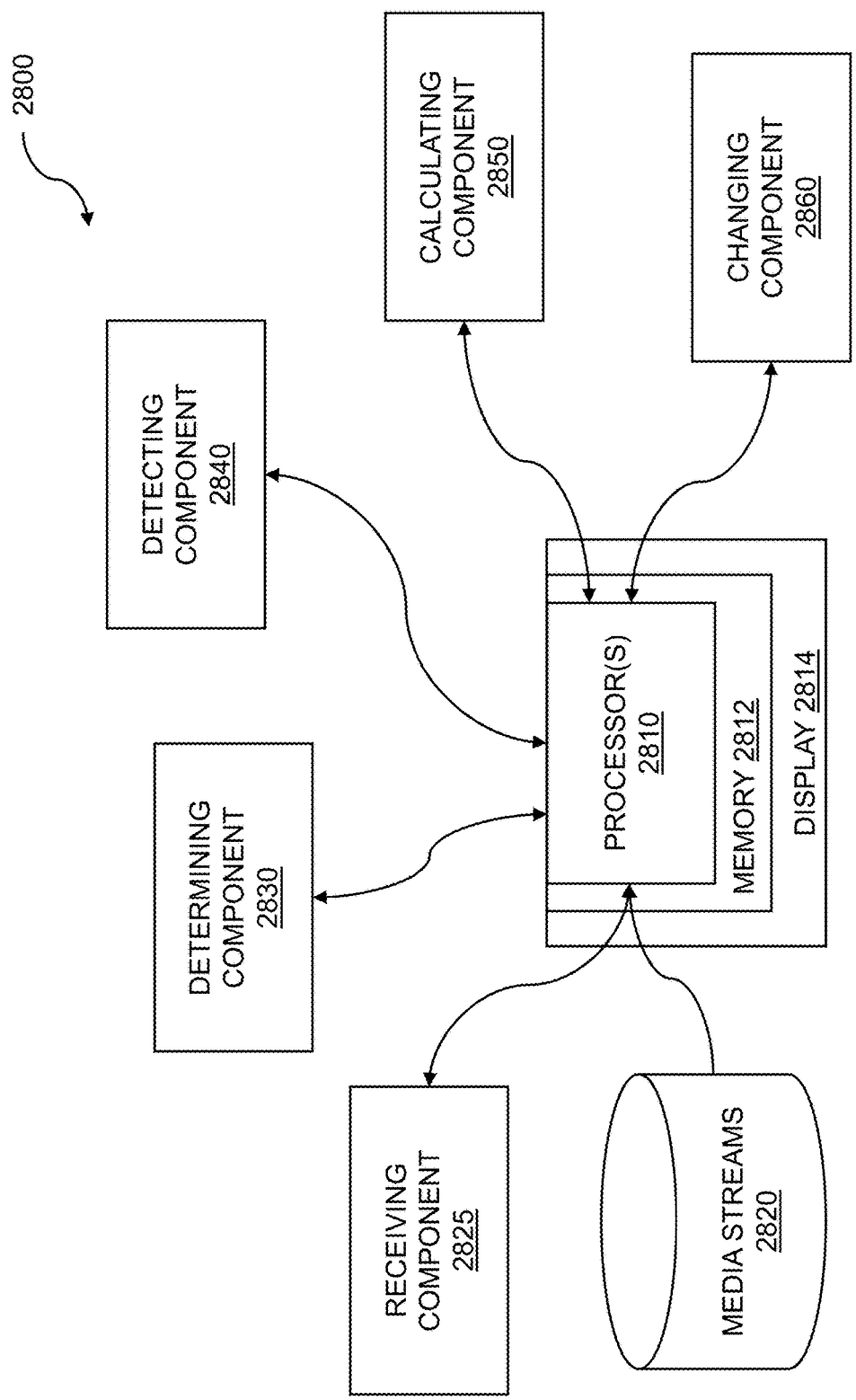
FIG. 28 is a system diagram for media stream playback.

FIG. 28 is a system diagram for media stream playback. Media stream playback can be based on an audio and video stream rendering modification based on a device rotation metric. The system 2800 can include one or more processors 2810 coupled to a memory 2812 which stores instructions. The system 2800 can include a display 2814 coupled to the one or more processors 2810 for displaying data, videos, intermediate steps, instructions, short-form videos, and so on. In embodiments, one or more processors 2810 are coupled to the memory 2812 where the one or more processors, when executing the instructions which are stored, are configured to: receive one or more media streams from a server, wherein the one or more media streams are targeted for display on a handheld media stream playback device; determine an orientation of the handheld device during playback of at least one of the one or more media streams on the handheld device; detect a change in the orientation of the handheld device, wherein the change occurs during playback of the at least one of the one or more media streams; calculate a rotation angle of the handheld device, based on the detection; and change the playback of at least one of the one or more media streams on the handheld device, based on the rotation angle.

The system 2800 can include a collection or repository of videos and data represented as media streams 2820. The videos and data of media streams 2820 may be stored in storage such as electronic storage coupled to the one or more processors, a database, one or more statically linked libraries, one or more dynamically linked libraries, or other appropriate video or data media stream formats. The media streams can include a variety of media content such as movies, television series, news programs, sporting events, political debates, videos, short-form videos, video frames, composite videos, and the like. The data can include data associated with video displays, media stream metadata, and so on. The videos or other media content can present a story, an advertisement, a political message, an educational segment, and the like. A media stream such as a video or a short-form video can include a video from among a plurality of videos, where the videos can comprise a wide range or variety of content. The data can include textual information or data that can be associated with a media stream, as discussed below. The textual information can be augmented with image information, themes, and so on.

The system 2800 can include a receiving component 2825. The receiving component 2825 can enable the system 2800 to receive media streams 2820 for audio and video stream rendering modification based on a device rotation metric. The receiving component can be included within a device that also includes processor 2810, memory 2812, and/or display 2814. The receiving component 2825 can be included externally from other components of the system 2800. The receiving component 2825 can receive media streams 2820 from a network, such as the Internet or other suitable network. The one or more media streams are targeted for display on a handheld media stream playback device. The server can include a local server, a remote server, a cloud-based server, a distributed server, and so on. The handheld media stream playback device can include a personal electronic device such as a smartphone, a tablet, a PDA, and the like. The handheld device can display one or more media streams substantially simultaneously. The one or more media streams can include videos, short-form videos, etc. The media streams that are received can be downloaded from or recommended by a library of media streams on the server, selected by a user, provided to a user, crowdsourced by users, etc. The media streams, videos, short-form videos, etc., can include a variety of content. The media streams can include travel videos, cooking videos, home-improvement videos, makeup videos, animal videos, and the like. The media streams can include an aspect ratio, a resolution, a range of color temperatures, a range of brightness, etc., appropriate for display on the handheld media stream playback device. The receiving component may further perform media stream analysis such as video scene analysis, where video scene analysis is performed on each of the plurality of videos. The video scene analysis can include detecting video cuts, video content, and so on.

The system 2800 can include a determining component 2830. The determining component 2830 can include functions and instructions for determining a plurality of parameters pertaining to a video and a second plurality of parameters pertaining to a video display, including an orientation of the handheld device during playback of at least one of the one or more media streams on the handheld device. The orientation can be determined in an absolute sense, such as by using a compass-based direction or a gravity-based position. Alternatively, the orientation can be determined in a relative sense, such as by using an accelerometer-based change of device position from an arbitrary starting point, for example, the orientation of the device when playback is first initiated. The plurality of parameters pertaining to the video can include video content, resolution, duration, digital rights management information, and so on. Embodiments include determining various parameters of the video including size of the video, the size of a viewport, a rotation angle of a viewport, and a scale factor. The second plurality of parameters pertaining to a video display can include display type, size, resolution, refresh rate, color temperature, display orientation (relative or absolute), etc. The orientation of the handheld device can include an orientation of a display screen associated with the handheld device. In embodiments, the orientation of the handheld device can include a substantially vertical orientation, a substantially horizontal orientation, a rotated orientation relative to horizontal or vertical, and so on. The orientation can include a clockwise rotation of the handheld device, a counterclockwise rotation of the handheld device, etc. The orientation of the handheld device can affect playback of media streams by effect media stream playback speed. Discussed below, the orientation of the handheld device can cause a change in the number of or combination of media streams that can be played back on the handheld device. In embodiments, a combination of media streams can be changed from a multiple view playback in an original orientation to a single view playback, based on the rotation angle. In a usage example, a user can be viewing two or more side-by-side media streams while she holds her handheld device in a substantially horizontal orientation. After rotating her device to a substantially vertical orientation, one media stream can remain for continued viewing.

The system 2800 can include a detecting component 2840. The detecting component 2840 can include functions and instructions for detecting the change of a plurality of parameters pertaining to a video stream and a video stream display, including detecting a change of an orientation of the handheld device during playback of at least one of the one or more media streams on the handheld device. The change that is detected by detecting component 2840 can be a relative change, an absolute change, or a combination of both relative and absolute changes. The change in orientation of the handheld device can include changing orientation from horizontal to vertical, vertical to horizontal, or changing to an orientation based on any angle between vertical and horizontal. The change in orientation of the handheld device occurs during playback of the at least one of the one or more media streams. The change in orientation can occur in a three-dimensional (3D) space, including orientation changes of roll, pitch, and yaw. The system 2800 can accommodate the 3D changes by the same or different responses. For example, a change in orientation from portrait to landscape may invoke one type of change, whereas a change in orientation from vertical to horizontal may invoke the same or a different type of change.

The system 2800 can include a calculating component 2850. The calculating component 2850 can include functions and instructions for calculating a rotation angle of the playback device, based on determining an initial orientation of the playback device and detecting a change in the orientation of the handheld playback device. The initial orientation and the change in orientation can be relative amounts, absolute amounts, or a combination of both relative and absolute amounts. The calculating component 2850 can calculate a rotation metric used to modify or change one or more media streams. The calculating the rotation angle can determine an angle based on degrees, radians, etc. In embodiments, the rotation angle can be used to generate a rotation metric wherein the rotation metric impacts zoom calculations and renderings for the multiple view playback. In a usage example, a user changing the rotation angle of her handheld device by tipping the handheld device away from herself might zoom out the media stream, while tipping the device toward herself might zoom in the media stream. Rotating the handheld device clockwise or counterclockwise can change the view of the one or more or a combination of media streams. In embodiments, a combination can be changed from a multiple view playback in an original orientation to a single view playback, based on the rotation angle. The rotation angle can further be used to change playback speed of one or more media streams, captioning provided based on the media streams, and so on. Discussed further below, embodiments can include changing the playback, the caption, and the one or more media streams, based on the rotation angle.

The system 2800 can include a changing component 2860. The changing component 2860 can include functions and instructions for modifying a video stream. The changing component 2860 can include functions and instructions for audio and video stream rendering modification based on a device rotation metric. The rendering can be based on the gravity sensor data, trimming, zooming, and the like. The rendering can include displaying the video in the rectangle. As discussed throughout, displaying in the rectangle can be based on scaling, zooming, trimming, etc. The rendering can include a visible video mask, where the visible video mask can be generated by rotating the rectangle. In embodiments, the rendering can include communicating the visible video mask to a user and overlaying the visible video mask on a video recording device screen. The video recording device can include a digital video recording device such as a video camera, a web camera (webcam), etc. The rendering can be based on a rotation metric that is calculated for a handheld video and audio media stream playback device. The changing can include changing one or more media streams. Embodiments include changing the playback of a combination of two or more media streams, based on the rotation angle. The changing can include removing one or more media streams from the playback, adding one or more media streams, and so on. In embodiments, the combination is changed from a single view playback in an original orientation to a multiple view playback, based on the rotation angle.

Consider a usage example in which a user rotates her handheld device from a vertical orientation to a horizontal orientation. The play can be changed from the single view playback while the device was vertically oriented to a combination of media streams that can be viewable while the device is in a horizontal orientation. Similarly, the play can be changed if the user changes the orientation of her handheld device from horizontal to vertical. In embodiments, the combination can change from a multiple view playback in an original orientation to a single view playback, based on the rotation angle. The device need not be oriented solely in the horizontal orientation or the vertical orientation. The device can be oriented at any angle between horizontal (0 degrees) and vertical (90 degrees). The playback can also include captioning associated with one or more media streams. Further embodiments can include changing the playback, the caption, and the one or more media streams, based on the rotation angle. Discussed above and throughout, the changing playback can affect zooming in or zooming out of the one or more media streams. The changing playback enables the user to control how the one or more media streams are presented, rendered, or displayed on a handheld device. In embodiments, the changing the playback can enable an immersive video experience. The immersive video experience can enable a virtual reality experience, an augmented reality experience, a mixed reality experience, etc. The changing can be used to control further characteristics of the playback of the media streams. Further embodiments include detecting a further change in the orientation of the handheld device, wherein the further change indicates a return toward the orientation that was initially determined, and wherein volume of the additional audio stream is diminished, based on a magnitude of the return.

The system 2800 can include a computer program product embodied in a non-transitory computer readable medium for media stream playback, the computer program product comprising code which causes one or more processors to perform operations of: receiving one or more media streams from a server, wherein the one or more media streams are targeted for display on a handheld media stream playback device; determining an orientation of the handheld device during playback of at least one of the one or more media streams on the handheld device; detecting a change in the orientation of the handheld device, wherein the change occurs during playback of the at least one of the one or more media streams; calculating a rotation angle of the handheld device, based on the detecting; and changing the playback of at least one of the one or more media streams on the handheld device, based on the rotation angle.

The system 2800 can provide a computer system for media stream playback comprising: a memory which stores instructions; one or more processors coupled to the memory wherein the one or more processors, when executing the instructions which are stored, are configured to: receive one or more media streams from a server, wherein the one or more media streams are targeted for display on a handheld media stream playback device; determine an orientation of the handheld device during playback of at least one of the one or more media streams on the handheld device; detect a change in the orientation of the handheld device, wherein the change occurs during playback of the at least one of the one or more media streams; calculate a rotation angle of the handheld device, based on the detection; and change the playback of at least one of the one or more media streams on the handheld device, based on the rotation angle.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc;

an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A processor-implemented method for media stream playback comprising:
   receiving one or more media streams from a server, wherein the one or more media streams are targeted for display on a handheld media stream playback device;
   determining an orientation of the handheld device during playback of at least one of the one or more media streams on the handheld device;
   detecting a change in the orientation of the handheld device, wherein the change occurs during playback of the at least one of the one or more media streams;
   calculating an intermediate rotation angle of the handheld device, based on the detecting; and
   selectively changing a plurality of parameters associated with the playback of at least one of the one or more media streams on the handheld device, based on the intermediate rotation angle of the handheld device.

2. The method of claim 1 further comprising changing the playback of a combination of two or more media streams, based on the rotation angle.

3. The method of claim 2 wherein the combination is changed from a single view playback in an original orientation to a multiple view playback, based on the rotation angle.

4. The method of claim 3 wherein the original orientation includes a substantially vertical display screen on the handheld device.

5. The method of claim 3 wherein the single view playback comprises a single video channel and a single audio channel and wherein the multiple view playback comprises a plurality of video channels and a corresponding plurality of audio channels.

6. The method of claim 3 wherein the single view playback comprises a single video channel and a pair of audio channels and wherein the multiple view playback comprises a plurality of video channels and a corresponding plurality of pairs of audio channels.

7. The method of claim 3 wherein the rotation angle is used to generate a rotation metric, wherein the rotation metric impacts zoom calculations and renderings for the multiple view playback.

8. The method of claim 2 wherein the combination is changed from a multiple view playback in an original orientation to a single view playback, based on the rotation angle.

9. The method of claim 8 wherein the original orientation includes a substantially horizontal display screen on the handheld device.

10. The method of claim 1 further comprising obtaining a caption related to the one or more media streams.

11. The method of claim 10 further comprising changing the playback caption and the one or more media streams, based on the rotation angle.

12. The method of claim 11 wherein the caption is removed when the handheld device is substantially vertical.

13. The method of claim 11 wherein the caption is displayed when the handheld device is substantially horizontal.

14. The method of claim 1 wherein the changing the playback affects a zoom of the one or more media streams.

15. The method of claim 14 wherein the zoom results in an extended portion being displayed for the one or more media streams.

16. The method of claim 15 further comprising filling extended portions of the at least one of the one or more media streams with video image data.

17. The method of claim 16 wherein the filling is accomplished by generating the video image data by image processing.

18. The method of claim 16 wherein the filling covers peripheral regions of a video display beyond content contained in the at least one of the one or more media streams.

19. The method of claim 18 wherein the peripheral regions are exposed, based on the rotation angle.

20. The method of claim 1 wherein the calculating the rotation angle is based on one or more motion sensors included in the handheld device.

21. The method of claim 20 wherein the motion sensors comprise a gyroscope, an accelerometer, a gravity sensor, or a magnetic field sensor within the handheld device.

22. The method of claim 1 wherein the handheld device includes a mobile device.

23. The method of claim 1 wherein the changing the playback enables an immersive video experience.

24. The method of claim 23 wherein the immersive video experience enables virtual reality or augmented reality viewing.

25. The method of claim 1 wherein an additional audio stream is added to the playback, based on the rotation angle.

26. The method of claim 25 further comprising detecting a further change in the orientation of the handheld device, wherein the further change indicates a return toward the orientation that was initially determined, and wherein volume of the additional audio stream is diminished, based on a magnitude of the return.

27. A non-transitory computer readable medium that stores a computer program for media stream playback, the computer program comprising code which causes one or more processors to perform operations of:
receiving one or more media streams from a server, wherein the one or more media streams are targeted for display on a handheld media stream playback device;
determining an orientation of the handheld device during playback of at least one of the one or more media streams on the handheld device;
detecting a change in the orientation of the handheld device, wherein the change occurs during playback of the at least one of the one or more media streams;
calculating an intermediate rotation angle of the handheld device, based on the detecting; and
selectively changing a plurality of parameters associated with the playback of at least one of the one or more media streams on the handheld device, based on the intermediate rotation angle of the handheld device.

28. A computer system for media stream playback comprising:
a memory which stores instructions;
one or more processors coupled to the memory wherein the one or more processors, when executing the instructions which are stored, are configured to:
receive one or more media streams from a server, wherein the one or more media streams are targeted for display on a handheld media stream playback device;
determine an orientation of the handheld device during playback of at least one of the one or more media streams on the handheld device;
detect a change in the orientation of the handheld device, wherein the change occurs during playback of the at least one of the one or more media streams;
calculate an intermediate rotation angle of the handheld device, based on the detection; and
selectively change a plurality of parameters associated with the playback of at least one of the one or more media streams on the handheld device, based on the intermediate rotation angle of the handheld device.

29. The method of claim 10 wherein the one or more media streams includes an audio track, and wherein changing the playback comprises simultaneously adjusting an opacity of the caption and a volume level of the audio track.

30. The method of claim 29 wherein the audio track is a vocal music track, and wherein the one or more media streams further comprise a second audio track, wherein the second audio track is an instrumental music track.

31. The method of claim 30 wherein a volume level of the instrumental music track is maintained while the volume of the vocal music track is adjusted.

32. The method of claim 30 wherein adjusting the opacity of the caption comprises fading out the caption as a function of the rotation angle.

* * * * *